(12) United States Patent
Davidson

(10) Patent No.: US 6,885,944 B2
(45) Date of Patent: Apr. 26, 2005

(54) METHOD FOR DETECTING DIRECTION AND RELATIVE MAGNITUDE OF MAXIMUM HORIZONTAL STRESS IN EARTH'S CRUST

(75) Inventor: John Kenneth Davidson, Cremorne (AU)

(73) Assignee: Petrecon Australia Pty Ltd, Tasmania (AU)

( * ) Notice: Subject to any disclaimer, the term of this patent is extended or adjusted under 35 U.S.C. 154(b) by 136 days.

(21) Appl. No.: 10/276,669

(22) PCT Filed: May 18, 2001

(86) PCT No.: PCT/AU01/00568

§ 371 (c)(1),
(2), (4) Date: Nov. 18, 2002

(87) PCT Pub. No.: WO01/90783

PCT Pub. Date: Nov. 29, 2001

(65) Prior Publication Data

US 2003/0158669 A1 Aug. 21, 2003

(30) Foreign Application Priority Data

May 25, 2000 (AU) .............................................. PQ7746

(51) Int. Cl.[7] .................................................. G01V 1/00
(52) U.S. Cl. ............................................. 702/14; 703/5
(58) Field of Search ....................... 702/14, 16; 367/57, 367/53, 102, 73, 72; 705/110; 324/338; 703/10

(56) References Cited

U.S. PATENT DOCUMENTS

| | | | | |
|---|---|---|---|---|
| 2,407,644 A | * | 9/1946 | Benioff | 367/102 |
| 2,587,301 A | * | 2/1952 | Ewing | 367/127 |
| 2,792,067 A | * | 5/1957 | Peterson | 181/112 |
| 2,792,068 A | * | 5/1957 | Peterson | 367/58 |
| 3,350,634 A | * | 10/1967 | Hoehn, Jr. | 324/338 |
| 5,189,643 A | * | 2/1993 | Wang et al. | 367/38 |
| 5,229,976 A | * | 7/1993 | Boyd et al. | 367/73 |
| 5,251,184 A | * | 10/1993 | Hildebrand et al. | 367/72 |
| 5,661,698 A | * | 8/1997 | Cacas | 367/73 |
| 5,930,730 A | * | 7/1999 | Marfurt et al. | 702/16 |
| 5,982,707 A | * | 11/1999 | Abbott | 367/53 |
| 6,014,343 A | * | 1/2000 | Graf et al. | 367/38 |
| 6,138,076 A | * | 10/2000 | Graf et al. | 702/14 |

FOREIGN PATENT DOCUMENTS

GB          2 320 968 A        7/1998     ............ G01V/1/28

* cited by examiner

Primary Examiner—John Barlow
Assistant Examiner—Victor J Taylor
(74) Attorney, Agent, or Firm—William J. Sapone; Coleman Sudol Sapone P.C.

(57) ABSTRACT

This invention relates to a method for determining direction and relative magnitude of maximum horizontal stress in sedimentary basins within Earth's crust. In particular the method uses seismic reflection data in determining the direction and magnitude of stresses. The method involves identifying from seismic data faults which cut the upper continental crust and uses those faults in conjunction with globally simultaneous compressional structures such as anticline to map the horizontal stresses. The invention has a particular application in the hydrocarbon exploration and production industry and has the advantage of providing the results pre-drill.

82 Claims, 9 Drawing Sheets

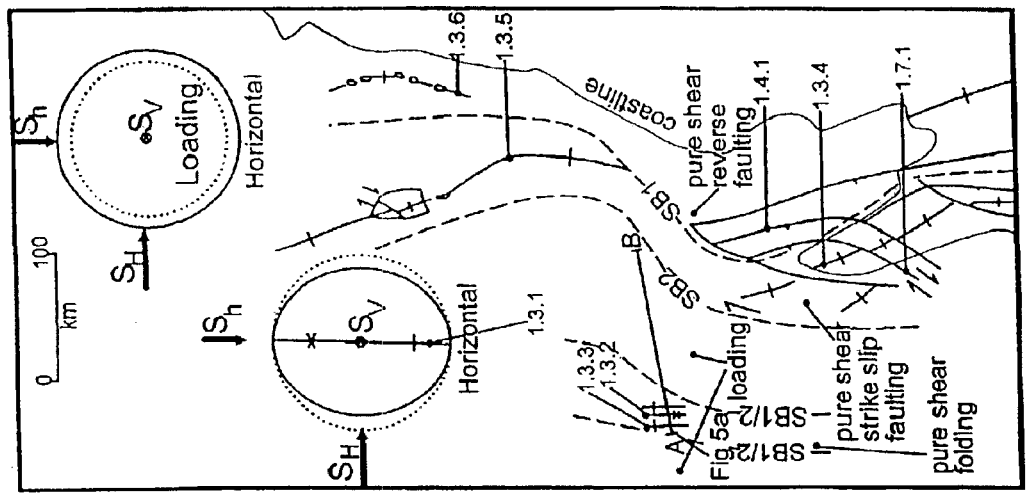
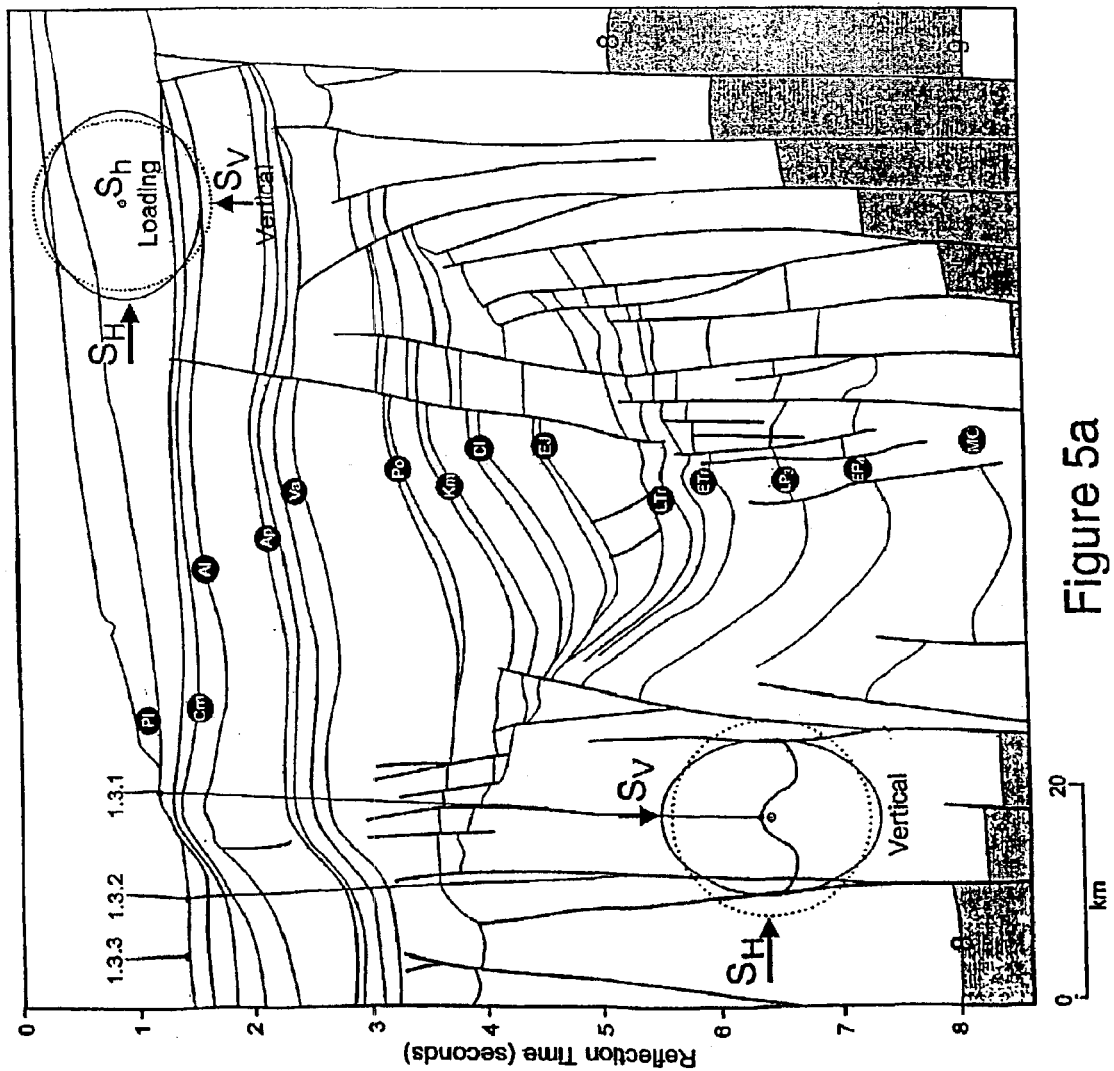
Figure 5a
Figure 5b

METHOD FOR DETECTING DIRECTION AND RELATIVE MAGNITUDE OF MAXIMUM HORIZONTAL STRESS IN EARTH'S CRUST

CROSS REFERENCE TO RELATED APPLICATIONS

This application is a national stage of PCT International Application no. PCT/AU01/00568 filed May 18, 2001.

BACKGROUND

This invention relates to seismic reflection data and in particular its use in determining the direction and magnitude of stresses acting within sedimentary basins in the earth's crust. The invention has a particular application in the hydrocarbon exploration and production industry and it will be convenient to hereinafter describe the invention in relation to this particular application. It should be appreciated however that the invention has wider applications.

Exploration for hydrocarbons is a risky business. There is no guarantee that having identified an area likely to contain hydrocarbons, commonly referred to as a prospect, hydrocarbons will be extracted. Hydrocarbons and in particular oil and natural gas accumulate and form reservoirs in sedimentary basins in the earth's crust. The oil and gas will desire to permeate through the sedimentary basin as a result of density and pore pressure differences and from compressional stresses generated within the earth's crust. The oil and gas will tend to rise through the sedimentary basin until stopped by a seal, such as a layer of shale, where it will accumulate and form the reservoir.

The process of successfully extracting hyrdocarbons requires an appreciation of the stresses acting across the prospect. The mutually perpendicular compressional components of the stresses acting across any prospect may be grouped into $S_V$ (vertical stress), $S_H$ (maximum horizontal stress), $S_h$ (minimal horizontal stress). Whilst an appreciation of these stresses is required for various stages of the exploration and extraction process, appreciation is particularly important when drilling an extraction wellbore. More specifically when these stress components are not equated they tend to deform the wellbore cross section from a circle to an ellipse, which in some cases can lead to the collapse of the wellbore, a phenomenon known as wellbore breakout. However an appropriately designed wellbore can sufficiently equate the stress components to achieve extraction of the hydrocarbon. Unfortunately with current techniques an appreciation of the stress components is generally only obtained by monitoring the deformation of the wellbore. Where wellbore breakout occurs this information is clearly too late.

SUMMARY OF THE INVENTION

It is an object of this invention to provide a method of determining the stress components acting within a prospect pre-drill. It is a further object of this invention to provide a method of determining the direction and relative magnitude of the stress components acting within a prospect.

The current plate tectonic theory of the motions of continents requires $S_H$ to be today a benign intermediate component of the stress limited parallel with graben axes in many sedimentary basins. According to Plate Tectonic Theory both in the past and today grabens form perpendicular to the direction of extensional movement of the continental plates at many plate margins and intra-plate. However this is not supported by the results obtained from earthquake, wellbore breakout, mine and corehole strain data taken from various sites in the upper crust. These data indicate that there are substantial compressional forces and $S_H$ is perpendicular to many basins today including the oil and gas reservoirs. Furthermore these data indicate that $S_H$ is acting at many plate margins and intra-plate.

Unfortunately the earthquake data is spread too widely to provide sufficient stress information to be the basis hydrocarbon exploration and production of individual prospects. Wellbore breakout data is, as previously stated, only available after drilling.

Seismic reflection data can be interpreted to indicate that many features have formed as a result of compression. The seismic reflection data can be interpreted to further suggest that the period of compression producing these structures commenced in the Pliocene geological epoch some five million years ago, and that similar compressional pulse periods have occurred repeatedly since at least the Early Triassic some 240 million years ago. When comparing the seismic data from locations around the earth the pulse periods can be interpreted as globally synchronous. Those globally synchronous pulses are tabulated in FIG. 1.

For the purposes of this specification the terms substantially vertical, substantially horizontal, substantially parallel and substantially perpendicular are intended to include orientations within 45 degrees.

According to this invention, there is provided a method of determining the direction of the maximum horizontal stress ($S_H$) at a horizon within a prospect including the following steps:

a) obtaining a plurality of seismic reflection lines within the prospect;

b) selecting at least two seismic reflection lines which cross the prospect substantially in the direction of maximum dip;

c) selecting at least one further seismic line which lies along a longitudinal axis of the prospect;

d) identifying on the selected seismic lines at least one substantially vertical crust cutting fault;

e) identifying on the selected seismic lines a plurality of horizons;

f) determining and assigning the plurality of horizons with geological ages;

g) identifying on the selected seismic lines at least one horizon produced during a compressional pulse period;

h) selecting at least one horizon from step g which is cut by at least one of the identified crust cutting faults, i) mapping in plan the crust cutting fault at the horizon selected in step h, j) identifying at least one anticline within the horizon identified in step i, k) mapping in plan the anticline at the horizon identified in step j, l) selecting at least one mapped anticline which in plan view extends substantially parallel to the adjacent crust cutting faults mapped in step i;

wherein $S_H$ is substantially perpendicular to the selected anticlines in that horizon.

According to another aspect of this invention there is provided a method of determining the direction of the maximum horizontal stress ($S_H$) at a horizon within a prospect including the following steps:

a) obtaining a plurality of seismic reflection lines within the prospect;

b) selecting at least two seismic reflection lines which cross the prospect substantially in the direction of maximum dip;

c) selecting at least one further seismic line which lies along a longitudinal axis of the prospect;

d) identifying on the selected seismic lines at least one substantially vertical crust cutting fault;

e) identifying on the selected seismic lines a plurality of horizons;

f) determining and assigning the plurality of horizons with geological ages;

g) identifying on the selected seismic lines at least one horizon produced during a compressional pulse period;

h) selecting at least one horizon from step g which is cut by at least one of the identified crust cutting faults, i) mapping in plan the crust cutting fault at the horizon selected in step h, j) identifying at least one syncline within the horizon identified in step i, k) mapping in plan the syncline at the horizon identified in step j, l) selecting at least one mapped syncline which in plan view extends substantially parallel to the adjacent crust cutting faults mapped in step i;

wherein $S_H$ is substantially perpendicular to the selected syncline in that horizon.

According to another aspect of this invention there is provided a method of determining the direction of the maximum horizontal stress ($S_H$) at a horizon within a prospect including the following steps:

a) obtaining a plurality of seismic reflection lines within the prospect;

b) selecting at least two seismic reflection lines which cross the prospect substantially in the direction of maximum dip;

c) selecting at least one further seismic line which lies along a longitudinal axis of the prospect;

d) identifying on the selected seismic lines at least one substantially vertical crust cutting fault;

e) identifying on the selected seismic lines a plurality of horizons;

f) determining and assigning the plurality of horizons with geological ages;

g) identifying on the selected seismic lines at least one horizon produced during a compressional pulse period;

h) selecting at least one horizon from step g which is cut by at least one of the identified crust cutting faults, i) mapping in plan the crust cutting fault at the horizon selected in step h, j) identifying at least one reverse fault within the horizon identified in step i, k) mapping in plan the reverse fault at the horizon identified in step j, l) selecting at least one mapped reverse fault which in plan view extends substantially parallel to the adjacent crust cutting faults mapped in step i;

wherein $S_H$ is substantially perpendicular to the selected reverse fault in that horizon.

According to another aspect of this invention there is provided a method of determining the direction of the maximum horizontal stress ($S_H$) at a horizon within a prospect including the following steps:

a) obtaining a plurality of seismic reflection lines within the prospect;

b) selecting at least two seismic reflection lines which cross the prospect substantially in the direction of maximum dip;

c) selecting at least one further seismic line which lies along a longitudinal axis of the prospect;

d) identifying on the selected seismic lines at least one substantially vertical crust cutting fault;

e) identifying on the selected seismic lines a plurality of horizons;

f) determining and assigning the plurality of horizons with geological ages;

g) identifying on the selected seismic lines at least one horizon produced during a compressional pulse period;

h) selecting at least one horizon from step g which is cut by at least one of the identified crust cutting faults, i) mapping in plan the crust cutting fault at the horizon selected in step h, j) identifying at least one non crust cutting normal fault within the horizon identified in step i, k) mapping in plan the non crust cutting normal fault at the horizon identified in step j, l) selecting at least one mapped non crust cutting normal which in plan view extends substantially perpendicular to the adjacent crust cutting faults mapped in step i;

wherein $S_H$ is substantially parallel to the selected non crust cutting normal faults in that horizon.

According to another aspect of this invention there is provided a method of determining the direction of the maximum horizontal stress ($S_H$) at a horizon within a prospect including the following steps:

a) obtaining a plurality of seismic reflection lines within the prospect;

b) selecting at least two seismic reflection lines which cross the prospect substantially in the direction of maximum dip;

c) selecting at least one further seismic line which lies along a longitudinal axis of the prospect;

d) identifying on the selected seismic lines at least one substantially vertical crust cutting fault;

e) identifying on the selected seismic lines a plurality of horizons;

f) determining and assigning the plurality of horizons with geological ages;

g) identifying on the selected seismic lines at least one horizon produced during a compressional pulse period;

h) selecting at least one horizon from step g which is cut by at least one of the identified crust cutting faults, i) mapping in plan the crust cutting fault at the horizon selected in step h, j) identifying at least one non crust cutting strike slip fault with a right or dextral sense of offset and a second non crust cutting strike slip fault with a left or sinistral sense of offset within the horizon steps k) mapping in plan the non crust cutting strike slip faults at the horizon identified in step j, l) selecting those mapped non crust cutting strike slip faults which in plan view extend substantially perpendicularly to the adjacent crust cutting faults mapped in step l, wherein $S_H$ is substantially parallel with the opposing approaching sectors formed by the selected dextral and sinistral non crust cutting strike slip faults in that horizon.

The method according to any one of the previous aspects may also include m1) identifying at least one anticline within the horizon identified in step i, n1) mapping in plan the anticline at the horizon identified in step m1, o1) selecting at least one mapped anticline which in plan view extends substantially parallel to the adjacent crust cutting faults mapped in step i;

wherein $S_H$ is substantially perpendicular to the selected anticlines in that horizon.

The method according to any one of the previous aspects may also include m2) identifying at least one syncline within the horizon identified in step i, n2) mapping in plan the syncline at the horizon identified in step m2, o2) selecting at least one mapped syncline which in plan view extends substantially parallel to the adjacent crust cutting faults mapped in step i;

wherein $S_H$ is substantially perpendicular to the selected syncline in that horizon.

The method according to any one of the previous aspects may also include m3) identifying at least one reverse fault within the horizon identified in step i, n3) mapping in plan the reverse fault at the horizon identified in step m3, o3) selecting at least one mapped reverse fault which in plan view extends substantially parallel to the adjacent crust cutting faults mapped in step i;

wherein $S_H$ is substantially perpendicular to the selected reverse fault in that horizon.

The method according to any one of the previous aspects may also include m4) identifying at least one non crust cutting normal fault within the horizon identified in step i, n4) mapping in plan the non crust cutting normal fault at the horizon identified in step m4, o4) selecting at least one mapped non crust cutting normal which in plan view extends substantially perpendicular to the adjacent crust cutting faults mapped in step i;

wherein $S_H$ is substantially parallel to the selected non crust cutting normal faults in that horizon.

The method according to any one of the previous aspects may also include m5) identifying at least one non crust cutting strike slip fault with a right or dextral sense of offset and a second non crust cutting strike slip fault with a left or sinistral sense of offset within the horizon identified in step l, n5) mapping in plan the strike slip faults at the horizon identified in step m5, o5) selecting those mapped strike slip faults which in plan view extend substantially perpendicularly to the adjacent crust cutting faults mapped in step i, wherein $S_H$ is substantially parallel with the opposing approaching sectors formed by the selected dextral and sinistral non crust cutting strike slip faults in that horizon.

The method according to any one of the previous aspects may also include p1) repeating step g for at least one different compressional pulse period, q1) identifying at least one anticline within the horizon identified in step p1, r1) mapping in plan the anticline at the horizon identified in step q1, s1) superimposing the mapped plan from r1 over the mapped plan from i t1) selecting at least one mapped anticline from step r1 which in plan view extends substantially parallel to the adjacent crust cutting faults mapped in step i;

wherein $S_H$ is substantially perpendicular to the selected anticlines from step t1 in the horizon identified from step p1.

The method according to any one of the previous aspects may also include p2) repeating step g for at least one different compressional pulse period, q2) identifying at least one syncline within the horizon identified in step p2, r2) mapping in plan the syncline at the horizon identified in step q2, s2) superimposing the mapped plan from r2 over the mapped plan from i t2) selecting at least one mapped syncline from step r2 which in plan view extends substantially parallel to the adjacent crust cutting faults mapped in step i;

wherein $S_H$ is substantially perpendicular to the selected synclines from step t2 in the horizon identified from step p2.

The method according to any one of the previous aspects may also include p3) repeating step g for at least one different compressional pulse period, q3) identifying at least one reverse fault within the horizon identified in step p3, r3) mapping in plan the reverse fault at the horizon identified in step q3, s3) superimposing the mapped plan from r3 over the mapped plan from i t3) selecting at least one mapped reverse fault from step r3 which in plan view extends substantially parallel to the adjacent crust cutting faults mapped in step i;

wherein $S_H$ is substantially perpendicular to the selected reverse fault from step t3 in the horizon identified from step p3.

The method according to any one of the previous aspects may also include p4) repeating step g for at least one different compressional pulse period, q4) identifying at least one non crust cutting normal fault within the horizon identified in step p4, r4) mapping in plan the non crust cutting normal fault at the horizon identified in step q4, s4) superimposing the mapped plan from r4 over the mapped plan from i t4) selecting at least one mapped non crust cutting normal fault from step r4 which in plan view extends substantially perpendicular to the adjacent crust cutting faults mapped in step i;

wherein $S_H$ is substantially parallel to the selected non crust cutting normal faults from step t4 in the horizon identified from step p4.

The method according to any one of the previous aspects may also include p5) repeating step g for at least one different compressional pulse period, q5) identifying at least one non crust cutting strike slip fault with a right or dextral sense of offset and a second non crust cutting strike slip fault with a left or sinistral sense of offset within the horizon step identified in step p5, r5) mapping in plan the non crust cutting strike slip faults at the horizon identified in step q5, s5) superimposing the mapped plan from r5 over the mapped plan from i t5) selecting those mapped strike slip faults which in plan view extend substantially perpendicularly to the adjacent crust cutting faults mapped in step i, wherein $S_H$ is substantially parallel with the opposing approaching sectors formed by the selected dextral and sinistral strike slip faults from step t5 in the horizon identified from step p5.

The method preferably includes obtaining more than two seismic reflection lines which cross the prospect substantially in the direction of maximum dip, and obtaining more than one seismic reflection line which crosses the more than two lines and extends approximately long the longitudinal axis of the prospect so as to produce a more detailed map.

It is further preferred that the determining and assigning step f includes obtaining survey wellbore data and conducting palaeogeographical analysis of that data to assign ages to the horizons. Alternatively it is preferred that the determining and assigning step f includes identifying on the selected seismic lines at least one globally distinctive horizon formed during a compressional pulse period and assigning ages to preceding and succeeding horizons formed during compressional pulse periods by reference to the chart of globally synchronous compressional pulses.

It is further preferred that the step of identifying at least one substantially vertical crust cutting fault includes identifying on the selected seismic lines an upper crust and identifying the faults that cut the upper crust as crust cutting faults. Alternatively it is preferred that the step of identifying at least one substantially vertical crust cutting fault includes identifying at least one substantially vertical fault, obtaining earthquake data in the region of the fault that indicates $S_H$ is substantially in a horizontal plane and approximately perpendicular to one other parallel trending substantially vertical fault in the region of the earthquake data, identifying such a fault as the crust cutting fault.

According to another aspect of this invention there is provided a method of determining the magnitude of the maximum horizontal stress ($S_H$) relative to the maximum vertical stress ($S_V$) at a horizon within a prospect including the following steps:

a) obtaining a plurality of seismic reflection lines within the prospect;

b) selecting at least two seismic reflection lines which cross the prospect substantially in the direction of maximum dip;

c) selecting at least one further seismic line which lies along a longitudinal axis of the prospect;

d) identifying on the selected seismic lines at least one substantially vertical crust cutting fault;

e) identifying on the selected seismic lines a plurality of horizons;

f) determining and assigning the plurality of horizons with geological ages;

g) identifying on the selected seismic lines at least one horizon produced during a compressional pulse period;

h) selecting at least one horizon from step g which is cut by at least one of the identified crust cutting faults, i) mapping in plan the crust cutting fault at the horizon selected in step h, j) identifying on the seismic line at the selected horizon produced during a compressional pulse period anticlines and non crust cutting reverse faults being structures extending parallel with crust cutting faults in the horizon, k) mapping in plan the identified anticlines and non crust cutting reverse faults for the selected horizon, l) identifying areas in the selected horizon where the anticlines are traversed vertically by non crust cutting reverse faults, m) identifying areas in the selected horizon where the anticlines are not traversed by any faults, wherein the magnitude of $S_H$ relative to $S_V$ is greater within those areas traversed by reverse faults.

The method of determining the magnitude may also include:

o) identifying areas on the seismic line in the selected horizon where the anticlines are not traversed by any faults, p) identifying areas on the seismic line in the selected horizon normal faults or strike slip faults and where the anticlines are traversed substantially longitudinally by the normal faults or strike slip faults, q) identifying areas on the seismic line in the selected horizon areas where there are no anticlines, wherein the magnitude of $S_H$ relative to $S_V$ decreases stepwise from the area identified in step m to the area identified in step p.

The method preferably includes repeating the method of determining the relative magnitude for a plurality of horizons produced during a compressional pulse period, and extrapolating the results obtained between the horizons.

The invention has various applications and advantages, some of which are identified below.

It is important to correctly direct the drill so that the effect of the stresses acting on the wellbore will be substantially minimised. It would be desirable to be able to determine the direction of $S_H$ and relative magnitude of $S_H$ to $S_V$ before drilling, to improve the likelihood of equating the stresses acting across the wellbore, and thereby increase the stability of the walls of the wellbore by employing the most effective drilling fluid density.

If the direction of $S_H$ varies over the area of the prospect, and if there are stress anisotropies such as $S_V$ greater than (>) $S_H$ and/or $S_H$>$S_h$, the stress differences across the wellbore will vary according to the direction and inclination of the wellbore. Accordingly an appreciation of the direction of $S_H$ is desirable for the planning of inclined or horizontal production wellbores such as extended-reach wellbores often having sub horizontal to horizontal components of several kilometers.

Wellbore instability problems can cause wellbores to be re-commenced or side-tracked at various depths with limited time to plan the side-tracked wellbore. Since seismic data is always gathered before any drilling within a prospect, seismic determination of $S_H$ direction would be desirable prior to the expensive decision to side-track.

A special case of a side-tracked well is the multilateral well in which one or more producing wells are drilled from the primary producing wellbore. The design of multilateral wells and the mechanical stability of multilateral junctions with the primary producing wellbore is best achieved if the stress regime is known.

The oil and gas can leak from the reservoir up a permeable fault, a dislocation extending through the seal, however, it has been noticed that when $S_H$ is substantially perpendicular to the fault it will tend not to leak, and when $S_H$ is substantially parallel to the fault it will tend to leak. It would be advantageous in the exploration process to be able to determine which faults would tend to leak and which faults would tend not to leak without having to drill through the reservoir within a prospect.

Actively leaking faults substantially parallel with $S_H$ allow fluids from deeper reservoirs and at high pressures to increase the pressures above the norm in shallower horizons and cause drilling hazards in such horizons if the drilling fluid density is too low. If the wellbore trajectory is parallel to sub parallel with the fault-line and the wellbore intersects the fractured zone adjacent to the active fault the fractured material may collapse and slough into the wellbore and cause the drillpipe to become stuck. This collapse problem can be reduced considerably if the wellbore is drilled perpendicular to the fault thus indicating it is desirable to be able to predict the orientation of $S_H$ predrill, hence predict active or leaking faults in the otherwise impermeable seal.

Fractures within a low permeability reservoir act as if they are small faults and tend to be open or closed depending on the stresses within the reservoir. Oil and gas can flow preferentially through the open fractures in the reservoir and it would be desirable to predict prior to drilling in which direction such flow is likely to be greatest. Similarly the effective permeability of a reservoir can be increased by increasing the fluid pressure within the reservoir to the point where the reservoir rocks will fracture parallel with $S_H$ a predrill knowledge of the direction of which is desirable in order to predict the orientation of the planned fractures.

The process of secondary recovery of hydrocarbons by water-flooding requires knowledge of open fracture direction and leaking fault orientation and also of possible fractures formed as a result of the water-flood all of which can be determined by a field-wide knowledge of $S_H$ direction and relative magnitude gained from producing well stress analyses supplemented by the method in this invention.

The disposal of drilling cuttings and liquid waste during the offshore production drilling process is often achieved by injection of such materials into the hydrocarbon-depleted reservoir by a process of fracture formation parallel with $S_H$. An accurate understanding of the distribution of $S_H$ direction hence of waste fracture orientation is required pre-disposal in the oil industry so as not to interfere with on-going production and in other possible waste disposal projects such as carbon dioxide sequestration in order to not interfere with ground-water resources.

It should be appreciated that where the earths upper crust has yielded under a compressional stress to create the anticlines and synclines that the direction of the major horizontal compressional stress component $S_H$ at that time would have been substantially perpendicular to those anticlines or synclines. Given that the earths crust is currently experiencing a compressional pulse $S_H$ will be similarly directed today because the orientation of the crust cutting faults which control the direction of the anticlines and synclines has not changed.

Where the determination of $S_H$ is to be used to identify those faults that would tend to leak and those faults that would tend to seal the method preferably includes identifying the fault on at least two seismic reflection lines, mapping in plan the faults, wherein the fault will tend to seal where $S_H$ is substantially perpendicular to the fault, whilst the fault will tend to leak where $S_H$ is at an angle to the fault other than substantially perpendicular. It is further preferred that the method includes identifying whether the fault cuts the entire upper crust as this would tend to indicate that the fault would be likely to be perpendicular to $S_H$ and therefore tend not to leak. It should be appreciated that the reverse scenario indicates that the fault would tend to leak. With this information, the exploration geologists and geophysicists can make informed judgment as to the likelihood of oil and gas leaking from the reservoir and therefore the potential profitability of drilling for oil and gas at that prospect.

It will be convenient to hereinafter describe the invention in greater detail by reference to the accompanying figures which facilitate understanding of the method according to this invention. The particularity of the figures and the related description is not to be understood as superseding the generality of the broad identification of the invention as given in the attached claims.

BRIEF DESCRIPTION OF THE DRAWINGS

FIG. 3b is a mapped plan of the Early Triassic Period based in part on the seismic line illustrated in FIG. 3a.

FIG. 4b is a mapped plan of the Valanginian period based in part on the seismic line illustrated in FIG. 4a.

FIG. 5a illustrates an interpreted seismic line identifying features from the Pliocene period.

FIG. 5b is a mapped plan of the Pliocene period based in part on the seismic line illustrated in FIG. 5a.

FIG. 7a illustrates in greater detail a portion of the seismic line from FIG. 6a.

DETAILED DESCRIPTION OF THE INVENTION

Exploration and production of hydrocarbons involve substantial research to be conducted on a prospect before any oil or gas can be successfully extracted from a reservoir. In general seismic reflection data is obtained for the prospect, from which the general location and dimensions of any reservoir will be estimated. An example seismic line is attached as FIG. 2. The method of obtaining a seismic reflection data should be well understood by those in the industry. Accordingly the method of obtaining the seismic data does not form part of this invention. Instead the invention relates to the interpretation and analysis of that data. In this regard, to enable an adequate interpretation and planning of the prospect requires at least two reflection lines and preferably a plurality of seismic reflection lines covering the prospect. In particular the prospect will be most clearly illustrated by at least two seismic reflection lines which cross the prospect substantially in the direction of maximum dip, and at least one further seismic line which lies along the longitudinal axis of the prospect. For ease of explanation only one line is provided.

Figure 2:
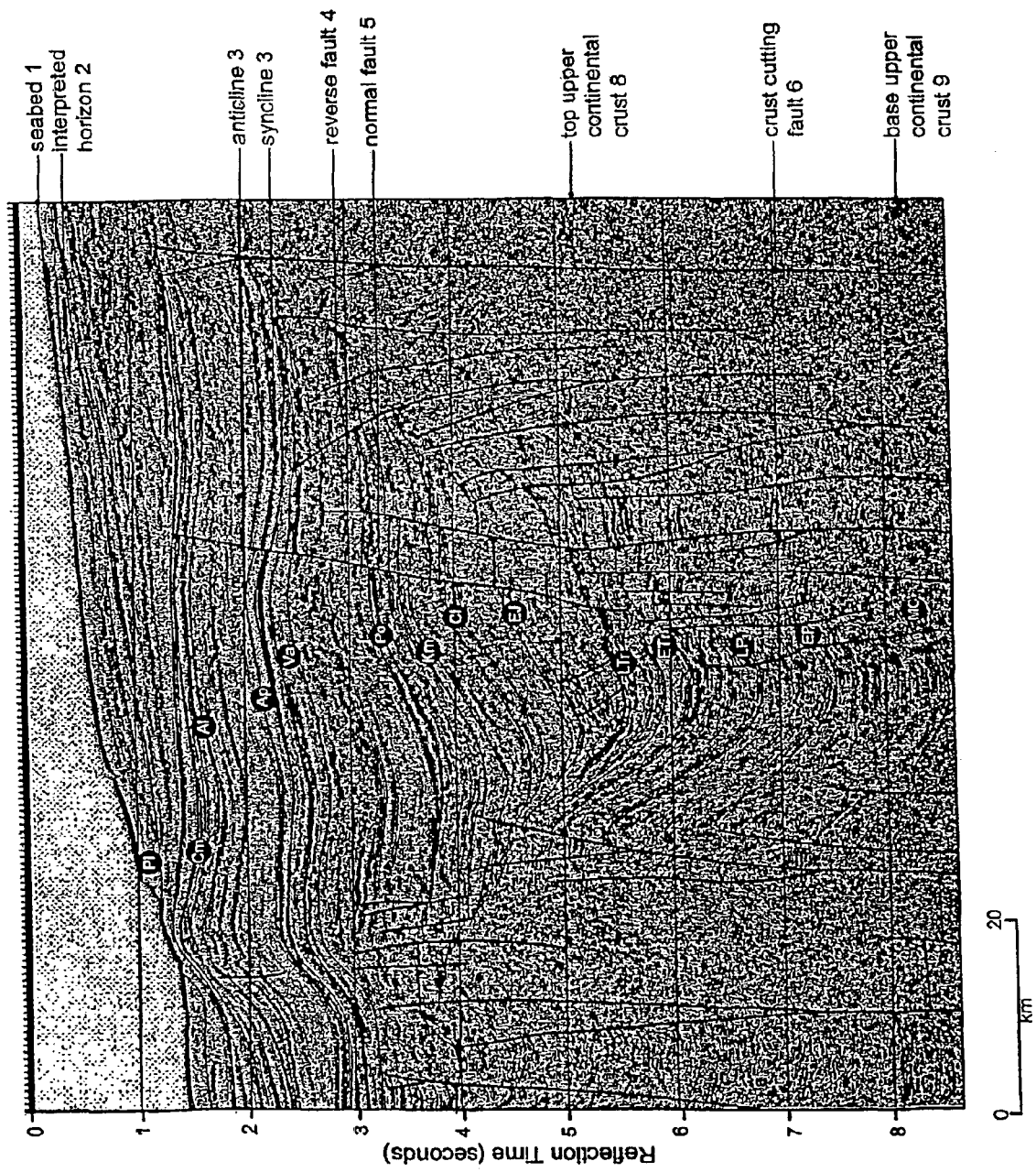
FIG. 2 illustrates an example seismic line

The seismic reflection line illustrated in FIG. 2 is typical of seismic reflection lines in that there is provided a haze of small shapes indicating various sub-surface features. This haze is interpreted to identify various generally horizontal horizons which were laid down at particular times. The various horizons are each assigned with a geological age. This is normally achieved by drilling a survey borehole within the prospect to extract samples at logged depths, and conducting palaeontological analysis on the samples extracted from the borehole. With the age of the samples identified at the logged depths this information can be correlated with the equivalent depths on the seismic line. Where the horizons must be assigned with geological ages without survey borehole data from within the prospect, it may be possible to extrapolate data from outside the prospect.

Referring again to FIG. 2 we can interpret various horizons cut by various faults. The seismic line can also be interpreted to illustrate anticlines 3 and synclines 3a, reverse faults 4, normal faults 5, substantially vertical crust cutting faults 6, top upper continental crust 8 and base upper continental crust 9. The likely location of the hydrocarbon reservoir 10 can be added along with an arbitrary wellbore 11. It should be noted that the drilling rig may not be always located directly above the reservoir and that the vertical wellbore illustrated is provided as an example only.

Figure 1:
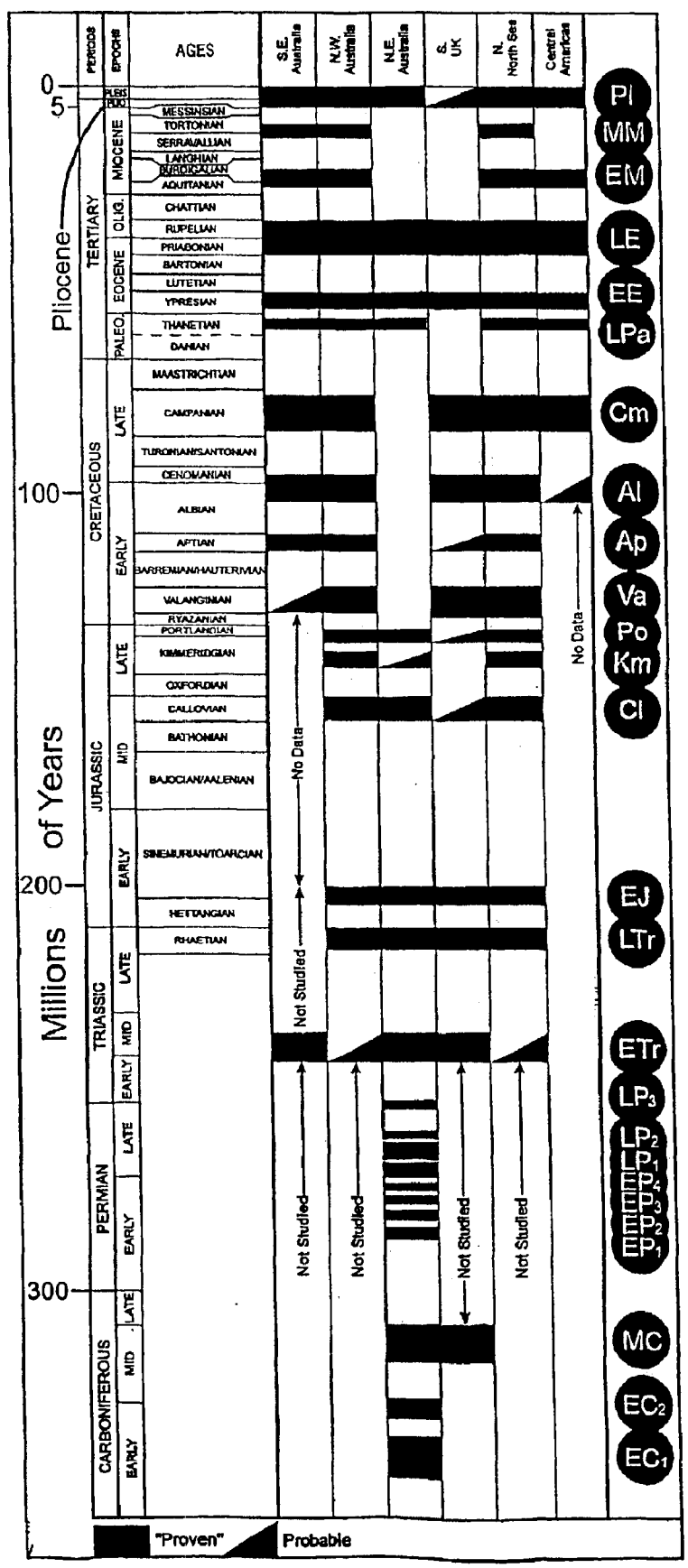
FIG. 1 tabulates the periods and locations of globally synchronous pulses.

The method according to the invention includes identifying on the seismic lines at least one horizon produced during a compressional pulse period. Whilst these periods have been tabulated in FIG. 1, one such horizon is identified by the numeral 2 in FIG. 2. This horizon is located at the base of the Pliocene age. The periods during which the earth experienced compressional pulses can be identified on the seismic line as those horizons which have folded. When this horizon is mapped in plan, those folds that are parallel to crust cutting faults indicate a fold formed as a result of a compressional stress. This indicates a period of a compressional pulse. Mapping in plan selected horizons will be discussed later in this specification.

It should be appreciated that not all folds are necessarily formed by compressional events which were globally synchronous. Non compressional pulse folds can be detected if they are not parallel with folds formed during a global compressional pulse period. More specifically the non compressional pulse folds are not substantially parallel to crust-cutting faults 6 and therefore not parallel from pulse to pulse and generally do not overprint and their amplitudes are not additive from pulse to pulse. Such folds should be disregarded for the purpose of this invention.

It is important to the method to interpret the seismic reflection data in a manner which recognises the compressional pulses. Referring again to FIG. 2 by way of illustration, the Late Triassic interpreted horizon 2 (LTr within the black circle) recorded below 5.0 seconds near the centre of the seismic line in FIG. 2 can be interpreted as an essentially horizontal surface after erosion of the folds formed during the Late Triassic compressional pulse period in the sedimentary basin. Extensional stresses within the lower crust beneath the base of the upper continental crust 9 both on FIG. 2 and on the same interpreted seismic line FIG. 3a caused the LTr horizon to subside. This formed a depositional thick between the LTr horizon and the Early Jurassic horizon (EJ within the black circle). At the time of EJ interpreted horizon the depositional thick began to rise causing the EJ sedimentary thick to migrate to the left of the rising axis. The resulting relative anticlinal uplift of the EJ interpreted horizon marks the Early Jurassic compressional pulse (EJ within the black circle). The sedimentary basin continued to subside. During the Callovian (Cl), Kimmeridgian (Km), Portlandian (Po), Valanginian (Va), Aptian (Ap), Albian (Al), Campanian (Cm) and Pliocene (Pl) compressional pulse periods the above process was repeated. FIG. 2 shows that the Ap interpreted horizon was deformed into an anticline 3 and the Valanginian interpreted horizon was deformed into a syncline 3a. It should be noted that the anticlines and synclines formed during the ETr, EJ, Cl, and Po interpreted horizons have been lost due to flattening of the landward or right side limbs of the anticlines caused by the later seawards or leftwards tilt of the sedimentary basin. Extensional thinning of the ductile lower continental crust below the base of the upper continental crust 9 created crust-cutting faults 6 within the brittle upper crust between the top and base of the upper continental crust 8 and 9. Many of these faults may have been normal faults 5 in which rocks on the upper side of the dipping fault surface moved downwards relative to the same rock units on the lower side of the dipping fault surface. Some of the normal faults 5 were compressed during these compressional pulse periods and became reverse faults 4 in which the upper side of the fault moved upwards relative to the same units on the lower side. The compressional effects of $S_H$ within the upper crust evidenced by reverse faults 4 at the LTr interpreted horizon was relaxed during the time from the Late Triassic (LTr) horizon 2 until the Early Jurassic (EJ) horizon 2 since the sediments represented by this intervening seismic unit thickened. The repeated reactivation of reverse faults 4 during compressional pulse periods generally coincides with the formation of anticlines 3 and synclines 3a and reverse faults 4 are often found in the cores of, and parallel with, the axes of anticlines 3. The succession of compressional pulses has continued to the Pliocene (Pl) compressional pulse period which is still active today as indicated by the developing anticlines 3 at the current seabed 1 in the upper left of FIG. 2.

Figure 3B:
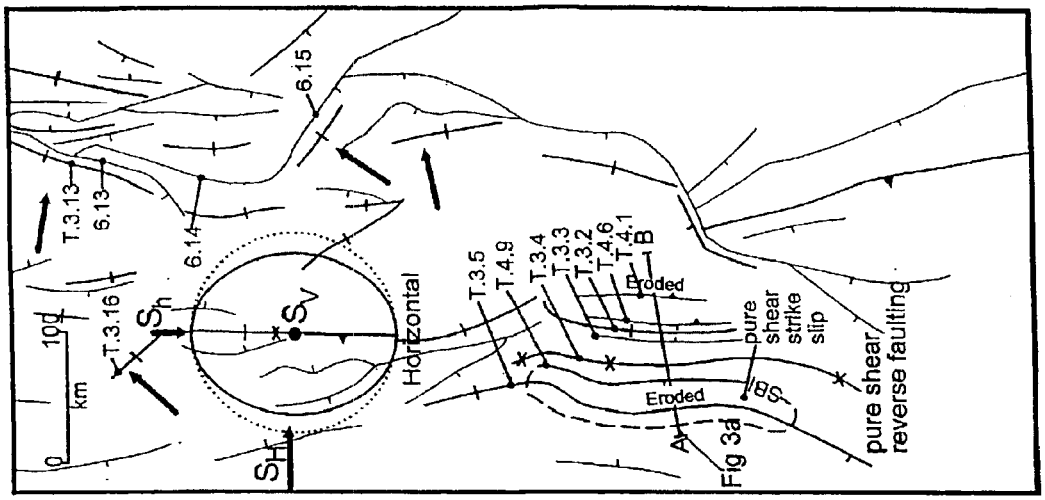
Figure 3A:
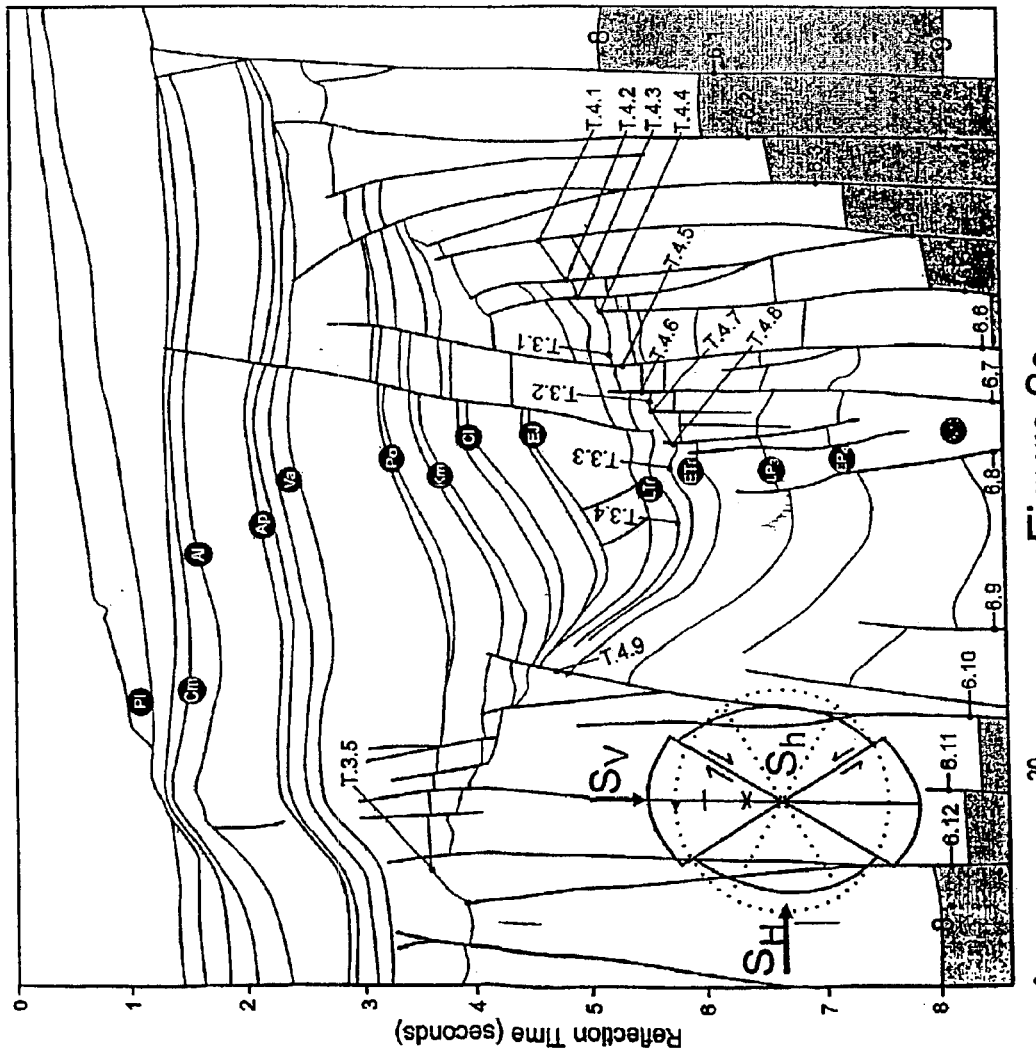
FIG. 3a illustrates an interpreted seismic line identifying features from the Early Triassic period.
Figure 4B:
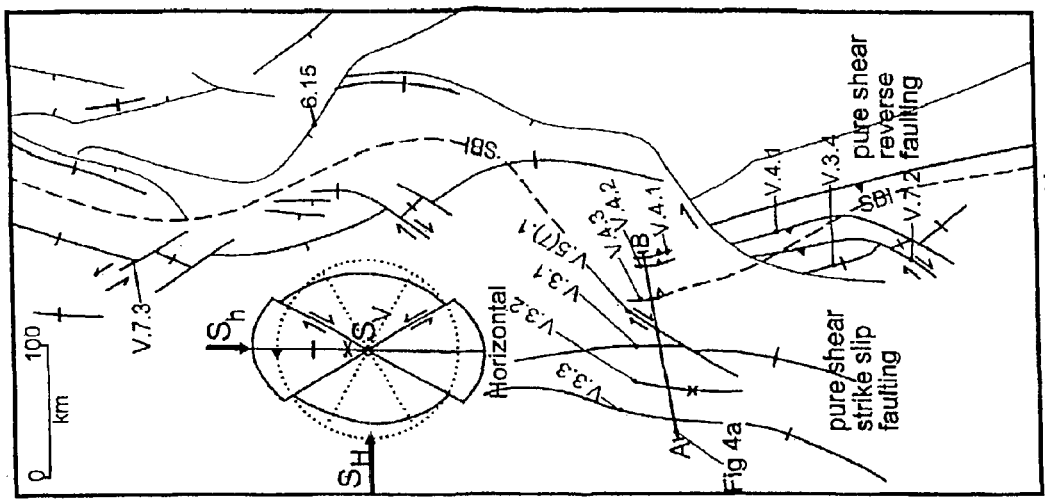
Figure 4A:
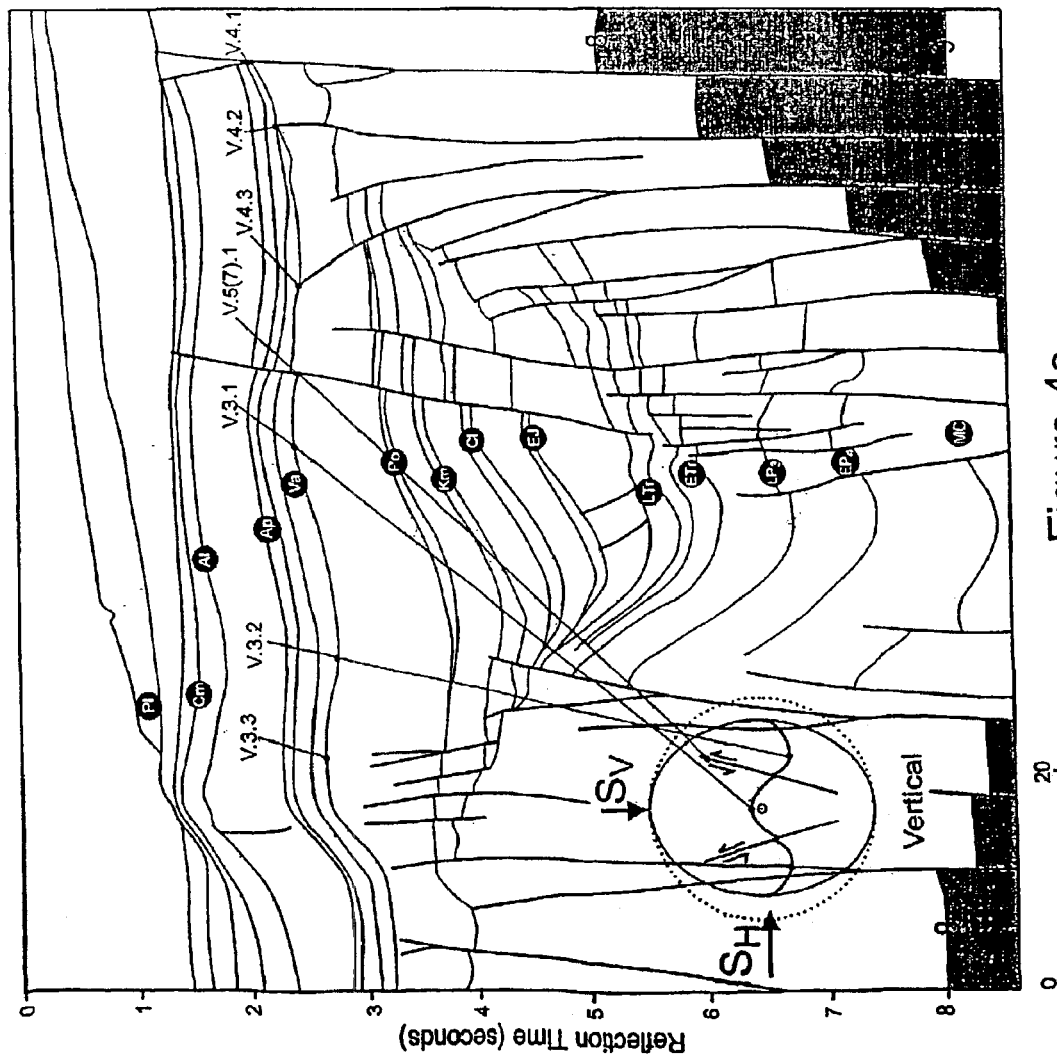
FIG. 4a illustrates an interpreted seismic line identifying features from the Valanginian period.

FIGS. 3a, 4a and 5a are each FIG. 2 with the seismic reflection haze removed to assist viewing the sub-surface formations. In this example three horizons from FIG. 2 formed by the compressional pulses have been selected however it should be appreciated that any number may be selected. The first selected is at the Early Triassic period (ETr, approximately two hundred and forty million years ago) and shown on FIG. 3a and mapped in FIG. 3b. The second selected is at the Valanginian period (Va, approximately one hundred and thirty million years ago) and shown on FIGS. 4a and 4b. The third selected is at the Pliocene period (Pl, approximately five million years ago) to recent and shown on FIGS. 5a and 5b. It should be appreciated that any horizon produced during a period of a compressional pulse could be selected to determine the direction of $S_H$ and the number of interpreted horizons adopted to be used over the prospect depends generally on the depth to which drilling is intended and the number of horizons in which drilling problems may occur. In this regard it should be noted that it in this example it is anticipated that hydrocarbons are likely to be located in the Early Triassic period, and therefore the interpreted horizon should at least include this period.

Having selected the compressional pulse identified at the ETr horizon as shown in FIG. 3a, the invention then requires identifying the structures and crust cutting faults 6 on the seismic line and mapping those in plan as shown on FIG. 3b. We note that the structures between points A and B on FIG. 3a include four anticlines marked T.3.1, T.3.2, T.3.3 and T.3.5, one syncline marked T.3a.4, ten reverse faults marked T.4.1 to T.4.10. It will be appreciated that the anticlines 3 are the peaks of the folds and that mapping the synclines 3a which are the troughs of the folds would also be suitable although in this example less practical because reverse faults 4 tend to form in anticlinal axes and together comprise key indicators of both the direction and magnitude of $S_H$. With the appropriate number of seismic lines to produce a plan map as previously discussed, the plan of this period is produced as FIG. 3b. The structures are marked in heavier lines, however there are too many too close together for all to be shown between A and B on FIG. 3b. Similar structures have been derived from the surrounding area and are shown at a somewhat lower structure density than that displayed between A and B.

Given that the plan map direction of crust cutting faults 6 has not changed with time, also that the folds were produced by the major horizontal compressional stress during the ETr period against and above the crust cutting faults 6, and given that the earth's rigid upper crust between horizons 8 and 9 is currently experiencing a similar horizontal compressional stress, it is possible to determine $S_H$ today as being perpendicular to the anticlines 3 and reverse faults 4 formed during the Early Triassic compressional pulse being shown on FIG. 3b.

The anticlines T.3.2 and T.3.4 formed adjacent or above crust cutting faults 6.7 and 6.8, as can be seen in FIG. 3a, are curved on FIG. 3b and not exactly unidirectional. In this example an average of their directions may be taken as an indication of $S_H$ over the A-B area of the map today. The anticlines T.3.13, T 3.14 and T.3.15 are each sub-parallel with their adjacent crust-cutting fault 6.13, 6.14 and 6.15 respectively and as the anticlines depart significantly from the north-south orientation of anticlines and reverse faults at A-B they are indicating variations in the direction of $S_H$ over the mapped area. It has been observed that crust cutting faults 6 of approximately two kilometers horizontal length are capable of inducing anticlines parallel with them and therefore responsible for variation in the direction of $S_H$.

Having determined the direction of $S_H$ it is also possible to determine the relative magnitude of $S_H$ relative to the other stress components at the selected horizon. In the lower left of FIG. 3a the dotted outline of a circle has been deformed into an ellipse, otherwise referred to as a deformation ellipse. The minor axis of the ellipse is aligned substantially parallel with $S_H$ and the ellipse has elongated vertically in the direction of $S_V$. This indicates that $S_H$ is much greater than (>>) $S_V$. The ellipse represents compression with ductile folding and the formation of anticlines such as T.3.5 and also represents brittle formation of reverse faults such as T.4.9 and T.4.10. The attitude of these faults can lie between near vertical and that nearer the dotted lines within the dotted circles depending on the origin of the underlying crust cutting faults 6.10 and 6.12 respectively. The ellipse in FIG. 3a is a vertical section of an ellipsoid. The horizontal section ellipsoid in FIG. 3b applies to the immediate area of the line A-B and shows the same shortening of the minor axis parallel with $S_H$. With no deformation parallel to $S_h$, this indicates that $S_H>S_h$. These results when combined with the ellipse from FIG. 3a indicate that $S_H>S_h>S_V$. In each zone of each uniform $S_H$ direction the anticlines and reverse faults have not rotated significantly and their growth has been essentially vertical with no normal faults transversely cutting the anticlines, therefore no elongation along the anticlinal axes in the direction of $S_h$, hence is indicative of pure shear reverse faulting, that is, $S_H>S_h>S_V$ and such a stress regime albeit of variable $S_H$ direction covers the entire mapped area of FIG. 3b.

Referring now to FIG. 4a, having selected the compressional pulse at Va interpreted horizon the invention again requires identifying the structures and crust cutting faults 6. The structures on FIG. 4a include two anticlines marked V.3.1 and V.3.3, one syncline marked V.3a.2 , three reverse faults marked V.4.1 to V.4.3 and one normal fault 5 marked V.5.1 which in plan view is a strike slip fault 7, hence the notation V.5(7).1. Again producing a mapped plan requires the appropriate seismic lines, and in this example is included as FIG. 4b. As with FIG. 3b, it is possible to determine $S_H$ in the Valanginian and during other compressional pulse periods including today as being perpendicular to the anticlines 3 and reverse faults 4.

In the centre left of FIG. 4a the dotted line of a circle has been deformed to an ellipse the short axis of which is parallel with $S_H$ but there has been no movement in the direction of $S_V$ so $S_H>S_V$. The ellipse represents compression with ductile folding and the formation of anticlines such as V.3.1 and synclines such as V.3a.2 and to have simultaneously undergone brittle extensional failure with the formation of normal faults 5 such as V.5(7).1. The ellipse in FIG. 4a is a vertical section of an ellipsoid. The horizontal section ellipsoid shown in FIG. 4b shows the same shortening parallel with $S_H$ and elongation parallel with $S_h$, which indicates that $S_H>>S_h$. When this information is combined with $S_H>S_V$ from FIG. 3a, this indicates that $S_H>S_V>S_h$.

The anticlines V.3.1 and V.3.3, although not exactly unidirectional, an average of their direction may be taken as an indication of the direction of $S_H$ being approximately east-west at the depth of the Va horizon 2 both at the time of the Valanginian and today.

It is to be noted that no anticline has formed parallel with crust-cutting fault 6.15. This indicates that $S_H$ is becoming more unidirectional in the younger sedimentary section and, being further from 6.15, not responding to the north-westerly trend of the crust-cutting fault 6.15 as it had in the deeper Early Triassic, FIG. 3b wherein the anticline T.3.15 formed parallel with crust cutting fault 6.15.

The general direction of $S_H$ can also be limited by using a deformational ellipse in conjunction with normal faults 5 with shear lines or strike slip faults 7 which are often non crust cutting such as V.5(7).1 and V.7.3. On the map FIG. 4b the strike slip faults 7 have opposing arrows of relative horizontal displacement across each fault and the strike slip faults 7 will identify a sector the approximate bisector of which identifies the limits of $S_H$. Two such sectors are formed by the strike-slip faults V.5(7).1 with V.7.2 the bisector of which is approximately east-west. The sector is indicating elongation parallel with the slightly rotating anticlinal axes in the horizontal plane which is indicative of pure shear strike-slip faulting. This indicates that $S_H>S_V>S_h$ which covers the mapped area in the vicinity of section A-B and anticline V.3.4. This method may then be reproduced for each of the compressionally pulsed periods in order to check for consistency or variation of $S_H$ direction both horizontally and vertically over the mapped area. This provides the drilling engineers with an indication of the direction of $S_H$ today at the various depths for wellbores to be drilled into a prospect. It is noted that $S_H>>S_V$ for pure shear reverse faulting and $S_H>S_V$ for pure shear strike slip faulting are indicating that the relative magnitude of $S_H$ to $S_V$ is decreasing towards the surface in a sedimentary basin and this will be discussed in relation to $S_H$ magnitude.

Referring now to FIG. 5a, having selected the Pliocene to recent compressional pulse identified as the interpreted horizon seabed 1 (Pl within the black circle) the invention then requires identifying the structures on FIG. 5a which amounts to one anticline 1.3.1. This structure is then mapped in plan using the appropriate seismic lines, and shown as FIG. 5b. In the lower left of FIG. 5a the dotted outline of a circle has deformed similarly to that in FIG. 3a with ductile folding and the formation of anticline 1.3.1 but without brittle deformation evidenced by the absence of reverse faults. The horizontal section of the ellipsoid in the upper left of FIG. 5b has similarly deformed at low stress levels of pure shear folding in which $S_H > S_h > S_V$. In the upper right of FIG. 5a the dotted outline of a circle has deformed to an ellipse with vertical shortening due to $S_V$, and horizontal elongation which indicates $S_V > S_H$. Without perceivable folding or faulting, the horizontal plane of the ellipsoid in the upper right of FIG. 5b has deformed from the dotted to a larger circle which indicates that $S_H = S_h$. This is the stress state of loading in which the action of gravity causes $S_V > S_H = S_h$.

In FIGS. 5a and 5b the anticline 1.3.1 indicates the direction of $S_H$ as being approximately east-west at the surface in the vicinity of section A-B. The absence of reverse faults 4 cutting the anticline 1.3.1 indicates that the stress component differences are low and the stress state is one of pure shear folding in ductile sediments rather than pure shear reverse faulting in more rigid sediments.

Figure 6A:
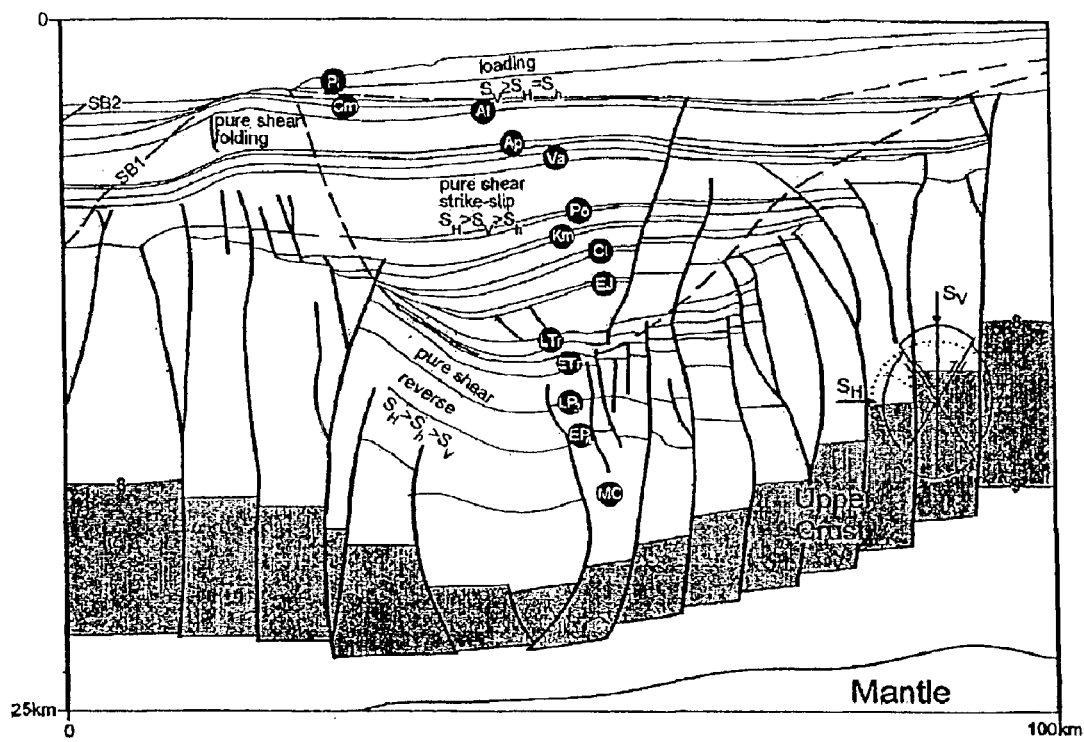
FIG. 6a illustrates an example of an interpreted seismic line in a mildly compressed basin.

The stress states identified on FIGS. 3a, 4a and 5a are shown on FIG. 6a in the vertical plane in which the stress boundaries 1 and 2 (SB1 and SB2) separate pure shear reverse faulting and folding from pure shear strike slip and pure shear strike slip from loading, respectively. The magnitude of $S_H$ in the rigid upper crust dissipates or decreases vertically from horizon to horizon in the sedimentary basin. In the horizontal plane $S_H$ can vary within a mapped horizon. Although FIG. 3b shows the entire mapped area is experiencing pure shear reverse faulting at the ETr horizon 2, in FIG. 4b SB1 is located to the right or east in the overlying Va interpreted horizon 2 and near the left and right end of line A-B. FIG. 5b shows SB1 and SB2 have moved further to the right in the overlying Pl horizon and that horizon is dominantly under loading. Below SB1, $S_H >>> S_V$, between SB1 and SB2, $S_H > S_V$ and above SB2, $S_H < S_V$. Thus the relative magnitude of $S_H$ to $S_V$ decreases from deeper parts of the sedimentary basin upwards to the seabed 1.

Figure 6B:
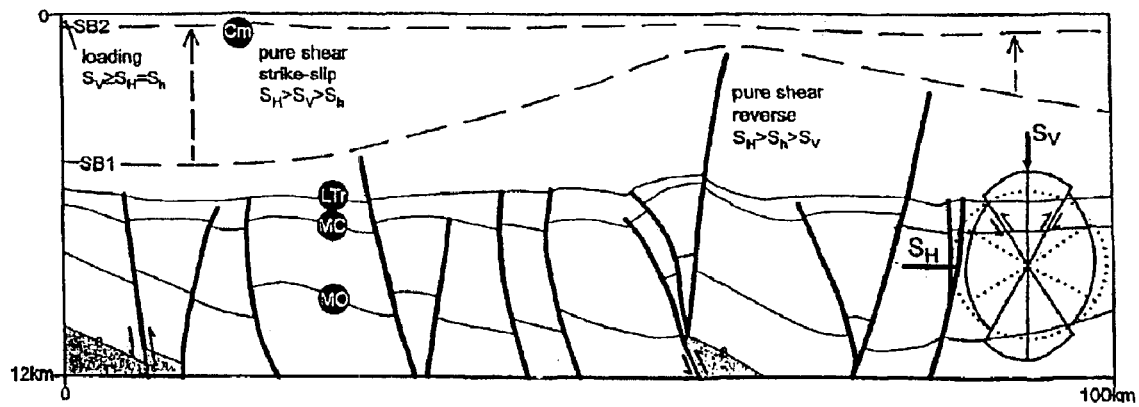
FIG. 6b illustrates an example of an interpreted seismic line in a slightly more compressed basin than illustrated in FIG. 6b.
Figure 7A:
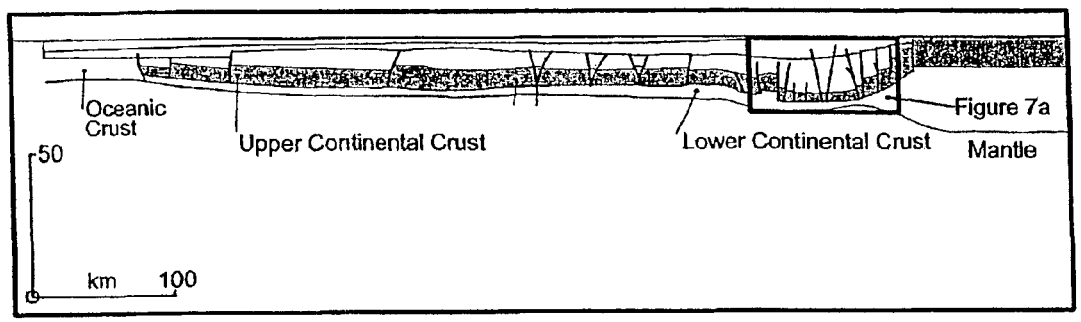
Figure 7B:
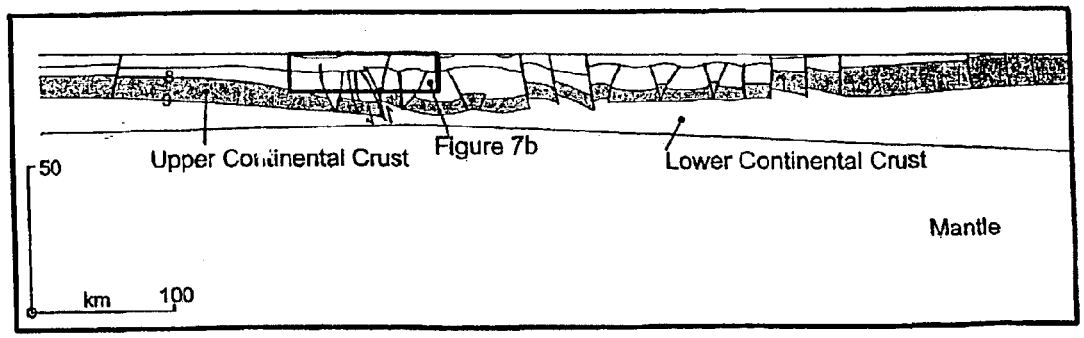
FIG. 7b illustrates in greater detail a portion of the seismic line from FIG. 6b.

FIG. 6a is FIG. 2 extended in depth to the earth's mantle and FIG. 6a is located as an inset in FIG. 7a which shows the regional setting of the seismic line on a continental crustally thinned extensional or pull-apart margin. FIG. 7b shows a basin in an intra plate setting at a similar horizontal scale to FIG. 7a. The inset of FIG. 7b is shown as an interpreted seismic line as FIG. 6b.

Comparison of FIGS. 6a and 6b establishes that the anticlines are more numerous and of greater amplitude at equivalent depths in the intra plate example and that comparison of FIGS. 7a and 7b shows that in the latter all the faults that cut interpreted horizons 8 and 9, the upper continental crust, are reverse faults 4 whereas many faults cutting those horizons in FIG. 6a have a normal displacement. If the level of pure shear reverse faulting is increased the substantially vertical crust-cutting fault near the left centre of FIG. 7b, below the FIG. 6b inset, might cause the upper crust to the right of the fault to over-ride the same unit to the left such that interpreted horizon 9 to the right would slide leftwards at a low angle thereby over-thrusting interpreted horizon 8. This will cause the crust cutting fault to become substantially horizontal. Where this occurs the method according to the invention fails to apply.

Figure 8:
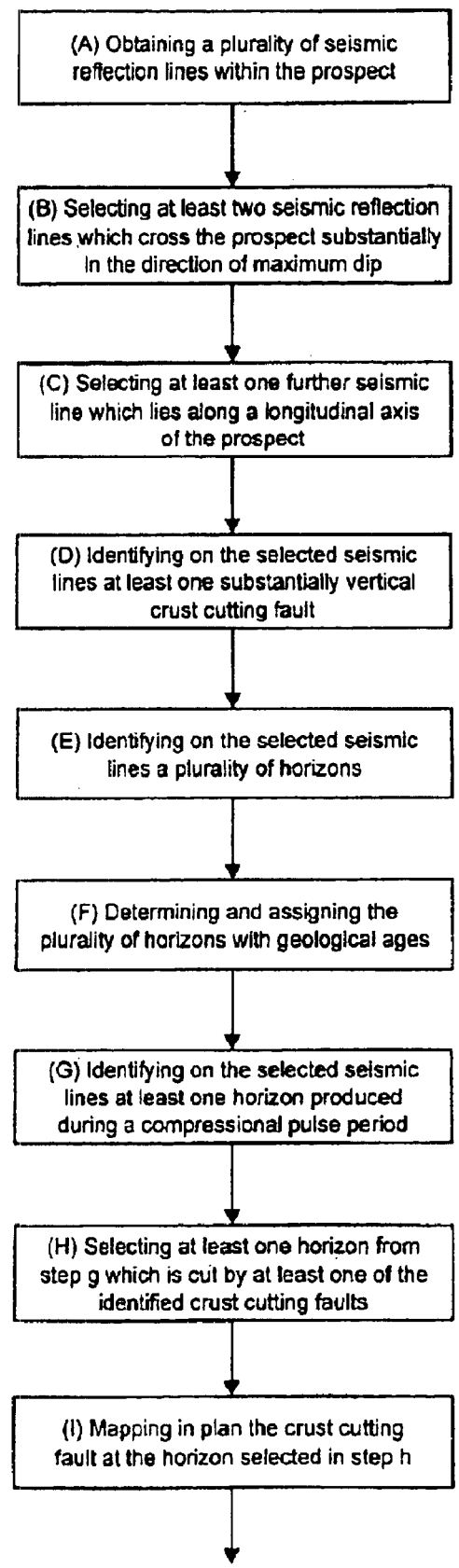
FIG. 8 is a block diagram illustrating the steps of the method of the invention.
Figure 8:
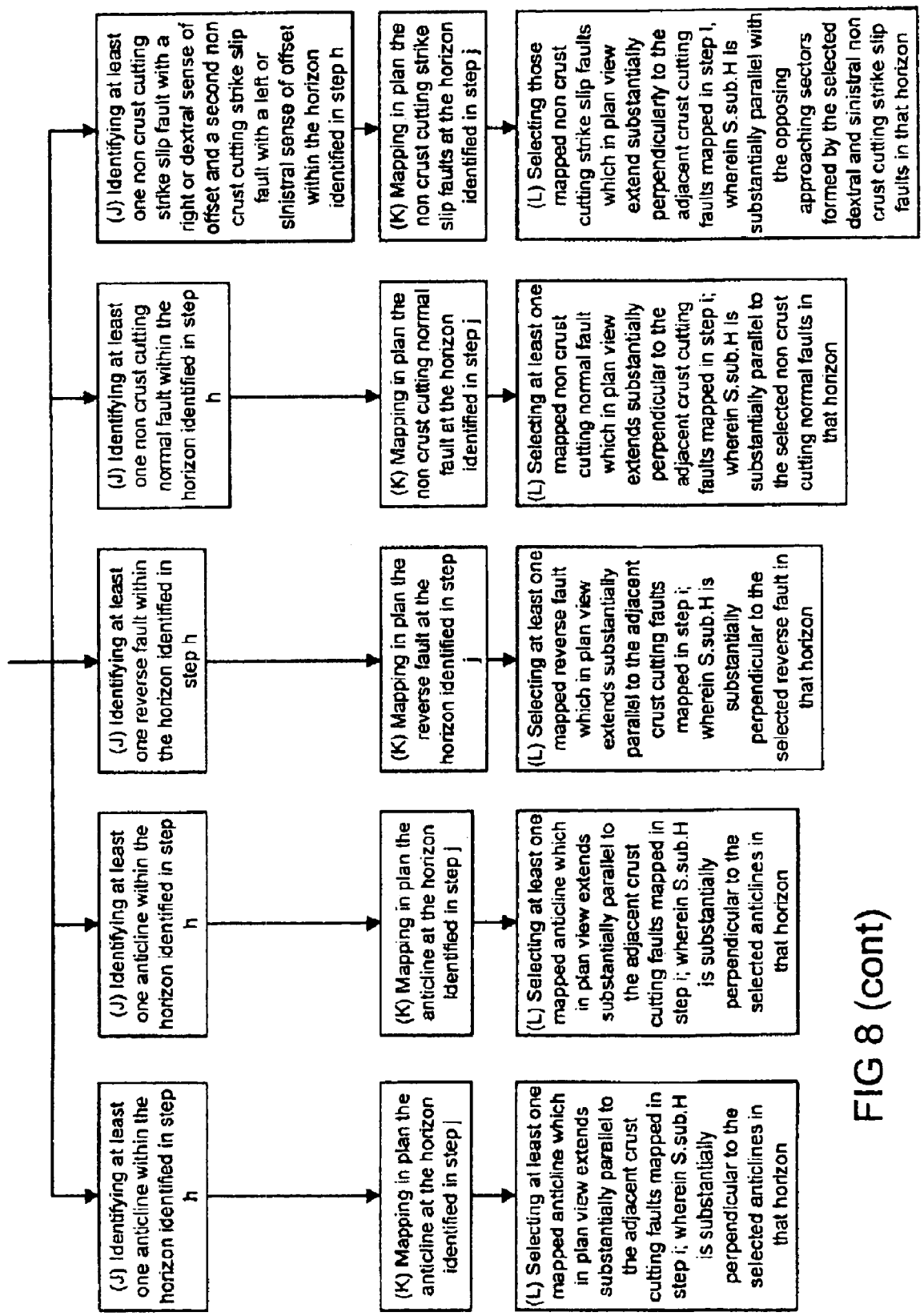

Referring to FIG. 8, a block diagram illustrating the steps of the above described method is presented, steps a–i being common to each of the embodiments described above, steps j–l presented as alternative steps relative to the variations in the embodiments described above.

It will be apparent from the foregoing description that the present invention provides a method for determining the direction and relative magnitude of $S_H$ at a selected prospect, and that this method has a clear application in the hydrocarbon exploration and production industry.

Various alterations, modifications and/or additions may be introduced into the constructions and arrangements of parts previously described without departing from the spirit or ambit of the invention as defined by the appended claims.

What is claimed is:

1. A method of determining the direction of the maximum horizontal stress ($S_H$) at a horizon within a prospect including the following steps:
   a) obtaining a plurality of seismic reflection lines within the prospect;
   b) selecting at least two seismic reflection lines which cross the prospect substantially in the direction of maximum dip;
   c) selecting at least one further seismic line which lies along a longitudinal axis of the prospect;
   d) identifying on the selected seismic lines at least one substantially vertical crust cutting fault;
   e) identifying on the selected seismic lines a plurality of horizons;
   f) determining and assigning the plurality of horizons with geological ages;
   g) identifying on the selected seismic lines at least one horizon produced during a compressional pulse period;
   h) selecting at least one horizon from step g which is cut by at least one of the identified crust cutting faults,
   i) mapping in plan the crust cutting fault at the horizon selected in step h, j) identifying at least one anticline within the horizon identified in step h, k) mapping in plan the anticline at the horizon identified in step j,
   l) selecting at least one mapped anticline which in plan view extends substantially parallel to the adjacent crust cutting faults mapped in step i wherein $S_H$ is substantially perpendicular to the selected anticlines in that horizon.

2. A method according to any one of claim 1 including:
   m2) identifying at least one syncline within the horizon identified in step i, n2) mapping in plan the syncline at the horizon identified in step m2,
   o2) selecting at least one mapped syncline which in plan view extends substantially parallel to the adjacent crust cutting faults mapped in step i; wherein $S_H$ is substantially perpendicular to the selected syncline in that horizon.

3. A method according to any one of claim 1 including:
   m3) identifying at least one reverse fault within the horizon identified in step i,
   n3) mapping in plan the reverse fault at the horizon identified in step m3, o3) selecting at least one mapped reverse fault which in plan view extends substantially parallel to the adjacent crust cutting faults mapped in step I, wherein $S_H$ is substantially perpendicular to the selected reverse fault in that horizon.

4. A method according to any one of claim 1 including:
   m4) identifying at least one non crust cutting normal fault within the horizon identified in step i,
   n4) mapping in plan the non crust cutting normal fault at the horizon identified in step m4, o4) selecting at least one mapped non crust cutting normal fault which in plan view extends substantially perpendicular to the adjacent crust cutting faults mapped in step i;

wherein $S_H$ is substantially parallel to the selected non crust cutting normal faults in that horizon.

5. A method according to any one of claim 1 including:

m5) identifying at least one non crust cutting strike slip fault with a right or dextral sense of offset and a second non crust cutting strike slip fault with a left or sinistral sense of offset within the horizon identified in step l, n5) mapping in plan the strike slip faults at the horizon identified in step m5, o5) selecting those mapped strike slip faults which in plan view extend substantially perpendicularly to the adjacent crust cutting faults mapped in step i, wherein $S_H$ is substantially parallel with the opposing approaching sectors formed by the selected dextral and sinistral non crust cutting strike slip faults in that horizon.

6. A method according to claim 1 including p1) repeating step g for at least one different compressional pulse period, q1) identifying at least one anticline within the horizon identified in step p1, r1) mapping in plan the anticline at the horizon identified in step q1, s1) superimposing the mapped plan from r1 over the mapped plan from i t1) selecting at least one mapped anticline from step r1 which in plan view extends substantially parallel to the adjacent crust cutting faults mapped in step i;

wherein $S_H$ is substantially perpendicular to the selected anticlines from step t1 in the horizon identified from step p1.

7. A method according to claim 1 including p2) repeating step g for at least one different compressional pulse period, q2) identifying at least one syncline within the horizon identified in step p2, r2) mapping in plan the syncline at the horizon identified in step q2, s2) superimposing the mapped plan from r2 over the mapped plan from i t2) selecting at least one mapped syncline from step r2 which in plan view extends substantially parallel to the adjacent crust cutting faults mapped in step i;

wherein $S_H$ is substantially perpendicular to the selected synclines from step t2 in the horizon identified from step p2.

8. A method according to claim 1 including p3) repeating step g for at least one different compressional pulse period, q3) identifying at least one reverse fault within the horizon identified in step p3, r3) mapping in plan the reverse fault at the horizon identified in step q3, s3) superimposing the mapped plan from r3 over the mapped plan from i t3) selecting at least one mapped reverse fault from step r3 which in plan view extends substantially parallel to the adjacent crust cutting faults mapped in step i;

wherein $S_H$ is substantially perpendicular to the selected reverse fault from step t3 in the horizon identified from step p3.

9. A method according to claim 1 including p4) repeating step g for at least one different compressional pulse period, q4) identifying at least one non crust cutting normal fault within the horizon identified in step p4, r4) mapping in plan the non crust cutting normal fault at the horizon identified in step q4, s4) superimposing the mapped plan from r4 over the mapped plan from i t4) selecting at least one mapped non crust cutting normal fault from step r4 which in plan view extends substantially perpendicular to the adjacent crust cutting faults mapped in step i;

wherein $S_H$ is substantially parallel to the selected non crust cutting normal faults from step t4 in the horizon identified from step p4.

10. A method according to claim 1 including p5) repeating step g for at least one different compressional pulse period, q5) identifying at least one non crust cutting strike slip fault with a right or dextral sense of offset and a second non crust cutting strike slip fault with a left or sinistral sense of offset within the horizon step identified in step p5, r5) mapping in plan the non crust cutting strike slip faults at the horizon identified in step q5, s5) superimposing the mapped plan from r5 over the mapped plan from i t5) selecting those mapped non crust cutting strike slip faults which in plan view extend substantially perpendicularly to the adjacent crust cutting faults mapped in step i, wherein $S_H$ is substantially parallel with the opposing approaching sectors formed by the selected dextral and sinistral strike slip faults from step t5 in the horizon identified from step p5.

11. A method according to claim 1 including obtaining more than three seismic reflection lines within the prospect so as to produce a more detailed map.

12. A method according to claim 11 including obtaining more than two seismic reflection lines which cross the prospect substantially in the direction of maximum dip, and obtaining more than one seismic reflection line which crosses the more than two lines and extends approximately long the longitudinal axis of the prospect so as to produce a more detailed map.

13. A method according to claim 1 wherein the determining and assigning step f includes obtaining survey wellbore data and conducting palaeontological analysis of that data to assign ages to the horizons.

14. A method according to claim 1 wherein the determining and assigning step f includes identifying on the selected seismic lines at least one globally distinctive horizon formed during a compressional pulse period and assigning ages to preceding and succeeding horizons formed during compressional pulse periods by reference to the chart of globally synchronous compressional pulses.

15. A method according to claim 1 wherein the step of identifying at least one substantially vertical crust cutting fault includes identifying on the selected seismic lines an upper crust and identifying the faults that cut the upper crust as crust cutting faults.

16. A method according to claim 1 wherein the step of identifying at least one substantially vertical crust cutting fault includes identifying at least one substantially vertical fault, obtaining earthquake data in the region of the fault that indicates $S_H$ is substantially in a horizontal plane and approximately perpendicular to one other parallel trending substantially vertical fault in the region of the earthquake data, identifying such a fault as the crust cutting fault.

17. A method of determining the direction of the maximum horizontal stress ($S_H$) at a horizon within a prospect including the following steps:

a) obtaining a plurality of seismic reflection lines within the prospect;

b) selecting at least two seismic reflection lines which cross the prospect substantially in the direction of maximum dip;

c) selecting at least one further seismic line which lies along a longitudinal axis of the prospect;

d) identifying on the selected seismic lines at least one substantially vertical crust cutting fault;

e) identifying on the selected seismic lines a plurality of horizons;

f) determining and assigning the plurality of horizons with geological ages;

g) identifying on the selected seismic lines at least one horizon produced during a compressional pulse period;

h) selecting at least one horizon from step g which is cut by at least one of the identified crust cutting faults, i) mapping in plan the crust cutting fault at the horizon selected in step h, j) identifying at least one syncline within the horizon identified in step h, k) mapping in plan the syncline at the horizon identified in step j, l) selecting at least one mapped syncline which in plan view extends substantially parallel to the adjacent crust cutting faults mapped in step i; wherein $S_H$ is substantially perpendicular to the selected syncline in that horizon.

18. A method according to claim 17 including:

m1) identifying at least one anticline within the horizon identified in step i, n1) mapping in plan the anticline at the horizon identified in step m1, o1) selecting at least one mapped anticline which in plan view extends substantially parallel to the adjacent crust cutting faults mapped in step i; wherein $S_H$ is substantially perpendicular to the selected anticlines in that horizon.

19. A method according to claim 17 including:

m3) identifying at least one reverse fault within the horizon identified in step i, n3) mapping in plan the reverse fault at the horizon identified in step m3, o3) selecting at least one mapped reverse fault which in plan view extends substantially parallel to the adjacent crust cutting faults mapped in step i;

wherein $S_H$ is substantially perpendicular to the selected reverse fault in that horizon.

20. A method according to claim 17 including:

m4) identifying at least one non crust cutting normal fault within the horizon identified in step i, n4) mapping in plan the non crust cutting normal fault at the horizon identified in step m4, o4) selecting at least one mapped non crust cutting normal fault which in plan view extends substantially perpendicular to the adjacent crust cutting faults mapped in step i;

wherein $S_H$ is substantially parallel to the selected non crust cutting normal faults in that horizon.

21. A method according to claim 17 including:

m5) identifying at least one non crust cutting strike slip fault with a right or dextral sense of offset and a second non crust cutting strike slip fault with a left or sinistral sense of offset within the horizon identified in step l, n5) mapping in plan the strike slip faults at the horizon identified in step m5, o5) selecting those mapped strike slip faults which in plan view extend substantially perpendicularly to the adjacent crust cutting faults mapped in step i, wherein $S_H$ is substantially parallel with the opposing approaching sectors formed by the selected dextral and sinistral non crust cutting strike slip faults in that horizon.

22. A method according to claim 17 including p1) repeating step g for at least one different compressional pulse period, q1) identifying at least one anticline within the horizon identified in step p1, r1) mapping in plan the anticline at the horizon identified in step q1, s1) superimposing the mapped plan from r1 over the mapped plan from i t1) selecting at least one mapped anticline from step r1 which in plan view extends substantially parallel to the adjacent crust cutting faults mapped in step i;

wherein $S_H$ is substantially perpendicular to the selected anticlines from step t1 in the horizon identified from step p1.

23. A method according to claim 17 including p2) repeating step g for at least one different compressional pulse period, q2) identifying at least one syncline within the horizon identified in step p2, r2) mapping in plan the syncline at the horizon identified in step q2, s2) superimposing the mapped plan from r2 over the mapped plan from i t2) selecting at least one mapped syncline from step r2 which in plan view extends substantially parallel to the adjacent crust cutting faults mapped in step i;

wherein $S_H$ is substantially perpendicular to the selected synclines from step t2 in the horizon identified from step p2.

24. A method according to claim 17 including p3) repeating step g for at least one different compressional pulse period, q3) identifying at least one reverse fault within the horizon identified in step p3, r3) mapping in plan the reverse fault at the horizon identified in step q3, s3) superimposing the mapped plan from r3 over the mapped plan from i t3) selecting at least one mapped reverse fault from step r3 which in plan view extends substantially parallel to the adjacent crust cutting faults mapped in step i;

wherein $S_H$ is substantially perpendicular to the selected reverse fault from step t3 in the horizon identified from step p3.

25. A method according to claim 17 including p4) repeating step g for at least one different compressional pulse period, q4) identifying at least one non crust cutting normal fault within the horizon identified in step p4, r4) mapping in plan the non crust cutting normal fault at the horizon identified in step q4, s4) superimposing the mapped plan from r4 over the mapped plan from i t4) selecting at least one mapped non crust cutting normal fault from step r4 which in plan view extends substantially perpendicular to the adjacent crust cutting faults mapped in step i;

wherein $S_H$ is substantially parallel to the selected non crust cutting normal faults from step t4 in the horizon identified from step p4.

26. A method according to claim 17 including p5) repeating step g for at least one different compressional pulse period, q5) identifying at least one non crust cutting strike slip fault with a right or dextral sense of offset and a second non crust cutting strike slip fault with a left or sinistral sense of offset within the horizon step identified in step p5, r5) mapping in plan the non crust cutting strike slip faults at the horizon identified in step q5, s5) superimposing the mapped plan from r5 over the mapped plan from i t5) selecting those mapped non crust cutting strike slip faults which in plan view extend substantially perpendicularly to the adjacent crust cutting faults mapped in step i, wherein $S_H$ is substantially parallel with the opposing approaching sectors formed by the selected dextral and sinistral strike slip faults from step t5 in the horizon identified from step p5.

27. A method according to claim 17 including obtaining more than three seismic reflection lines within the prospect so as to produce a more detailed map.

28. A method according to claim 27 including obtaining more than two seismic reflection lines which cross the prospect substantially in the direction of maximum dip, and obtaining more than one seismic reflection line which crosses the more than two lines and extends approximately long the longitudinal axis of the prospect so as to produce a more detailed map.

29. A method according to claim 17 wherein the determining and assigning step f includes obtaining survey wellbore data and conducting palaeontological analysis of that data to assign ages to the horizons.

30. A method according to claim 17 wherein the determining and assigning step f includes identifying on the selected seismic lines at least one globally distinctive horizon formed during a compressional pulse period and assigning ages to preceding and succeeding horizons formed during compressional pulse periods by reference to the chart of globally synchronous compressional pulses.

31. A method according to claim 17 wherein the step of identifying at least one substantially vertical crust cutting fault includes identifying on the selected seismic lines an upper crust and identifying the faults that cut the upper crust as crust cutting faults.

32. A method according to claim 17 wherein the step of identifying at least one substantially vertical crust cutting fault includes identifying at least one substantially vertical fault, obtaining earthquake data in the region of the fault that indicates $S_H$ is substantially in a horizontal plane and approximately perpendicular to one other parallel trending substantially vertical fault in the region of the earthquake data, identifying such a fault as the crust cutting fault.

33. A method of determining the direction of the maximum horizontal stress ($S_H$) at a horizon within a prospect including the following steps:

a) obtaining a plurality of seismic reflection lines within the prospect;

b) selecting at least two seismic reflection lines which cross the prospect substantially in the direction of maximum dip;

c) selecting at least one further seismic line which lies along a longitudinal axis of the prospect;

d) identifying on the selected seismic lines at least one substantially vertical crust cutting fault;

e) identifying on the selected seismic lines a plurality of horizons;

f) determining and assigning the plurality of horizons with geological ages;

g) identifying on the selected seismic lines at least one horizon produced during a compressional pulse period;

h) selecting at least one horizon from step g which is cut by at least one of the identified crust cutting faults, i) mapping in plan the crust cutting fault at the horizon selected in step h, j) identifying at least one reverse fault within the horizon identified in step h, k) mapping in plan the reverse fault at the horizon identified in step j, l) selecting at least one mapped reverse fault which in plan view extends substantially parallel to the adjacent crust cutting faults mapped in step i; wherein $S_H$ is substantially perpendicular to the selected reverse fault in that horizon.

34. A method according to claim 33 including:

m1) identifying at least one anticline within the horizon identified in step i, n1) mapping in plan the anticline at the horizon identified in step m1, o1) selecting at least one mapped anticline which in plan view extends substantially parallel to the adjacent crust cutting faults mapped in step i; wherein $S_H$ is substantially perpendicular to the selected anticlines in that horizon.

35. A method according to claim 33 including:

m2) identifying at least one syncline within the horizon identified in step i, n2) mapping in plan the syncline at the horizon identified in step m2, o2) selecting at least one mapped syncline which in plan view extends substantially parallel to the adjacent crust cutting faults mapped in step i; wherein $S_H$ is substantially perpendicular to the selected syncline in that horizon.

36. A method according to claim 33 including:

m4) identifying at least one non crust cutting normal fault within the horizon identified in step i, n4) mapping in plan the non crust cutting normal fault at the horizon identified in step m4, o4) selecting at least one mapped non crust cutting normal fault which in plan view extends substantially perpendicular to the adjacent crust cutting faults mapped in step i;

wherein $S_H$ is substantially parallel to the selected non crust cutting normal faults in that horizon.

37. A method according to claim 33 including:

m5) identifying at least one non crust cutting strike slip fault with a right or dextral sense of offset and a second non crust cutting strike slip fault with a left or sinistral sense of offset within the horizon identified in step l, n5) mapping in plan the strike slip faults at the horizon identified in step m5, o5) selecting those mapped strike slip faults which in plan view extend substantially perpendicularly to the adjacent crust cutting faults mapped in step i, wherein $S_H$ is substantially parallel with the opposing approaching sectors formed by the selected dextral and sinistral non crust cutting strike slip faults in that horizon.

38. A method according to claim 33 including p1) repeating step g for at least one different compressional pulse period, q1) identifying at least one anticline within the horizon identified in step p1, r1) mapping in plan the anticline at the horizon identified in step q1, s1) superimposing the mapped plan from r1 over the mapped plan from i t1) selecting at least one mapped anticline from step r1 which in plan view extends substantially parallel to the adjacent crust cutting faults mapped in step i;

wherein $S_H$ is substantially perpendicular to the selected anticlines from step t1 in the horizon identified from step p1.

39. A method according to claim 33 including p2) repeating step g for at least one different compressional pulse period, q2) identifying at least one syncline within the horizon identified in step p2, r2) mapping in plan the syncline at the horizon identified in step q2, s2) superimposing the mapped plan from r2 over the mapped plan from i t2) selecting at least one mapped syncline from step r2 which in plan view extends substantially parallel to the adjacent crust cutting faults mapped in step i;

wherein $S_H$ is substantially perpendicular to the selected synclines from step t2 in the horizon identified from step p2.

40. A method according to claim 33 including
p3) repeating step g for at least one different compressional pulse period, q3) identifying at least one reverse fault within the horizon identified in step p3, r3) mapping in plan the reverse fault at the horizon identified in step q3, s3) superimposing the mapped plan from r3 over the mapped plan from i t3) selecting at least one mapped reverse fault from step r3 which in plan view extends substantially parallel to the adjacent crust cutting faults mapped in step i; wherein $S_H$ is substantially perpendicular to the selected reverse fault from step t3 in the horizon identified from step p3.

41. A method according to claim 33 including
p4) repeating step g for at least one different compressional pulse period, q4) identifying at least one non crust cutting normal fault within the horizon identified in step p4, r4) mapping in plan the non crust cutting normal fault at the horizon identified in step q4, s4) superimposing the mapped plan from r4 over the mapped plan from i t4) selecting at least one mapped non crust cutting normal fault from step r4 which in plan view extends substantially perpendicular to the adjacent crust cutting faults mapped in step i;

wherein $S_H$ is substantially parallel to the selected non crust cutting normal faults from step t4 in the horizon identified from step p4.

42. A method according to claim 33 including
p5) repeating step g for at least one different compressional pulse period, q5) identifying at least one non crust cutting strike slip fault with a right or dextral sense of offset and a second non crust cutting strike slip fault with a left or sinistral sense of offset within the horizon step identified in step p5, r5) mapping in plan the non crust cutting strike slip faults at the horizon identified in step q5, s5) superimposing the mapped plan from r5 over the mapped plan from i t5) selecting those mapped non crust cutting strike slip faults which in plan view extend substantially perpendicularly to the adjacent crust cutting faults mapped in step i, wherein $S_H$ is substantially parallel with the opposing approaching sectors formed by the selected dextral and sinistral strike slip faults from step t5 in the horizon identified from step p5.

43. A method according to claim 33 including obtaining more than three seismic reflection lines within the prospect so as to produce a more detailed map.

44. A method according to claim 43 including obtaining more than two seismic reflection lines which cross the prospect substantially in the direction of maximum dip, and obtaining more than one seismic reflection line which crosses the more than two lines and extends approximately long the longitudinal axis of the prospect so as to produce a more detailed map.

45. A method according to claim 33 wherein the determining and assigning step f includes obtaining survey wellbore data and conducting palaeontological analysis of that data to assign ages to the horizons.

46. A method according to claim 33 wherein the determining and assigning step f includes identifying on the selected seismic lines at least one globally distinctive horizon formed during a compressional pulse period and assigning ages to preceding and succeeding horizons formed during compressional pulse periods by reference to the chart of globally synchronous compressional pulses.

47. A method according to claim 33 wherein the step of identifying at least one substantially vertical crust cutting fault includes identifying on the selected seismic lines an upper crust and identifying the faults that cut the upper crust as crust cutting faults.

48. A method according to claim 33 wherein the step of identifying at least one substantially vertical crust cutting fault includes identifying at least one substantially vertical fault, obtaining earthquake data in the region of the fault that indicates $S_H$ is substantially in a horizontal plane and approximately perpendicular to one other parallel trending substantially vertical fault in the region of the earthquake data, identifying such a fault as the crust cutting fault.

49. A method of determining the direction of the maximum horizontal stress ($S_H$) at a horizon within a prospect including the following steps:

a) obtaining a plurality of seismic reflection lines within the prospect;

b) selecting at least two seismic reflection lines which cross the prospect substantially in the direction of maximum dip;

c) selecting at least one further seismic line which lies along a longitudinal axis of the prospect;

d) identifying on the selected seismic lines at least one substantially vertical crust cutting fault;

e) identifying on the selected seismic lines a plurality of horizons;

f) determining and assigning the plurality of horizons with geological ages;

g) identifying on the selected seismic lines at least one horizon produced during a compressional pulse period;

h) selecting at least one horizon from step g which is cut by at least one of the identified crust cutting faults, i) mapping in plan the crust cutting fault at the horizon selected in step h, j) identifying at least one non crust cutting normal fault within the horizon identified in step h, k) mapping in plan the non crust cutting normal fault at the horizon identified in step j, l) selecting at least one mapped non crust cutting normal fault which in plan view extends substantially perpendicular to the adjacent crust cutting faults mapped in step i; wherein $S_H$ is substantially parallel to the selected non crust cutting normal faults in that horizon.

50. A method according to claim 49 including:
m1) identifying at least one anticline within the horizon identified in step i, n1) mapping in plan the anticline at the horizon identified in step m1, o1) selecting at least one mapped anticline which in plan view extends substantially parallel to the adjacent crust cutting faults mapped in step i; wherein $S_H$ is substantially perpendicular to the selected anticlines in that horizon.

51. A method according to claim 49 including:
m2) identifying at least one syncline within the horizon identified in step i, n2) mapping in plan the syncline at the horizon identified in step m2, o2) selecting at least one mapped syncline which in plan view extends substantially parallel to the adjacent crust cutting faults mapped in step i; wherein $S_H$ is substantially perpendicular to the selected syncline in that horizon.

52. A method according to claim 49 including:

m3) identifying at least one reverse fault within the horizon identified in step i, n3) mapping in plan the reverse fault at the horizon identified in step m3, o3) selecting at least one mapped reverse fault which in plan view extends substantially parallel to the adjacent crust cutting faults mapped in step i;

wherein $S_H$ is substantially perpendicular to the selected reverse fault in that horizon.

53. A method according to claim 49 including:

m5) identifying at least one non crust cutting strike slip fault with a right or dextral sense of offset and a second non crust cutting strike slip fault with a left or sinistral sense of offset within the horizon identified in step l, n5) mapping in plan the strike slip faults at the horizon identified in step m5, o5) selecting those mapped strike slip faults which in plan view extend substantially perpendicularly to the adjacent crust cutting faults mapped in step i, wherein $S_H$ is substantially parallel with the opposing approaching sectors formed by the selected dextral and sinistral non crust cutting strike slip faults in that horizon.

54. A method according to claim 49 including p1) repeating step g for at least one different compressional pulse period, q1) identifying at least one anticline within the horizon identified in step p1, r1) mapping in plan the anticline at the horizon identified in step q1, s1) superimposing the mapped plan from r1 over the mapped plan from i t1) selecting at least one mapped anticline from step r1 which in plan view extends substantially parallel to the adjacent crust cutting faults mapped in step i; wherein $S_H$ is substantially perpendicular to the selected anticlines from step t1 in the horizon identified from step p1.

55. A method according to claim 49 including p2) repeating step g for at least one different compressional pulse period, q2) identifying at least one syncline within the horizon identified in step p2, r2) mapping in plan the syncline at the horizon identified in step q2, s2) superimposing the mapped plan from r2 over the mapped plan from i t2) selecting at least one mapped syncline from step r2 which in plan view extends substantially parallel to the adjacent crust cutting faults mapped in step i;

wherein $S_H$ is substantially perpendicular to the selected synclines from step t2 in the horizon identified from step p2.

56. A method according to claim 49 including p3) repeating step g for at least one different compressional pulse period, q3) identifying at least one reverse fault within the horizon identified in step p3, r3) mapping in plan the reverse fault at the horizon identified in step q3, s3) superimposing the mapped plan from r3 over the mapped plan from i t3) selecting at least one mapped reverse fault from step r3 which in plan view extends substantially parallel to the adjacent crust cutting faults mapped in step i;

wherein $S_H$ is substantially perpendicular to the selected reverse fault from step t3 in the horizon identified from step p3.

57. A method according to claim 49 including p4) repeating step g for at least one different compressional pulse period, q4) identifying at least one non crust cutting normal fault within the horizon identified in step p4, r4) mapping in plan the non crust cutting normal fault at the horizon identified in step q4, s4) superimposing the mapped plan from r4 over the mapped plan from i t4) selecting at least one mapped non crust cutting normal fault from step r4 which in plan view extends substantially perpendicular to the adjacent crust cutting faults mapped in step i;

wherein $S_H$ is substantially parallel to the selected non crust cutting normal faults from step t4 in the horizon identified from step p4.

58. A method according to claim 49 including p5) repeating step g for at least one different compressional pulse period, q5) identifying at least one non crust cutting strike slip fault with a right or dextral sense of offset and a second non crust cutting strike slip fault with a left or sinistral sense of offset within the horizon step identified in step p5, r5) mapping in plan the non crust cutting strike slip faults at the horizon identified in step q5, s5) superimposing the mapped plan from r5 over the mapped plan from i t5) selecting those mapped non crust cutting strike slip faults which in plan view extend substantially perpendicularly to the adjacent crust cutting faults mapped in step i, wherein $S_H$ is substantially parallel with the opposing approaching sectors formed by the selected dextral and sinistral strike slip faults from step t5 in the horizon identified from step p5.

59. A method according to claim 49 including obtaining more than three seismic reflection lines within the prospect so as to produce a more detailed map.

60. A method according to claim 59 including obtaining more than two seismic reflection lines which cross the prospect substantially in the direction of maximum dip, and obtaining more than one seismic reflection line which crosses the more than two lines and extends approximately long the longitudinal axis of the prospect so as to produce a more detailed map.

61. A method according to claim 49 wherein the determining and assigning step f includes obtaining survey wellbore data and conducting palaeontological analysis of that data to assign ages to the horizons.

62. A method according to claim 49 wherein the determining and assigning step f includes identifying on the selected seismic lines at least one globally distinctive horizon formed during a compressional pulse period and assigning ages to preceding and succeeding horizons formed during compressional pulse periods by reference to the chart of globally synchronous compressional pulses.

63. A method according to claim 49 wherein the step of identifying at least one substantially vertical crust cutting fault includes identifying on the selected seismic lines an upper crust and identifying the faults that cut the upper crust as crust cutting faults.

64. A method according to claim 49 wherein the step of identifying at least one substantially vertical crust cutting fault includes identifying at least one substantially vertical fault, obtaining earthquake data in the region of the fault that indicates $S_H$ is substantially in a horizontal plane and approximately perpendicular to one other parallel trending substantially vertical fault in the region of the earthquake data, identifying such a fault as the crust cutting fault.

65. A method of determining the direction of the maximum horizontal stress ($S_H$) at a horizon within a prospect including the following steps:

a) obtaining a plurality of seismic reflection lines within the prospect;

b) selecting at least two seismic reflection lines which cross the prospect substantially in the direction of maximum dip; c) selecting at least one further seismic line which lies along a longitudinal axis of the prospect;

d) identifying on the selected seismic lines at least one substantially vertical crust cutting fault;

e) identifying on the selected seismic lines a plurality of horizons;

f) determining and assigning the plurality of horizons with geological ages;

g) identifying on the selected seismic lines at least one horizon produced during a compressional pulse period;

h) selecting at least one horizon from step g which is cut by at least one of the identified crust cutting faults, i) mapping in plan the crust cutting fault at the horizon selected in step h, j) identifying at least one non crust cutting strike slip fault with a right or dextral sense of offset and a second non crust cutting strike slip fault with a left or sinistral sense of offset within the horizon identified in step h, k) mapping in plan the non crust cutting strike slip faults at the horizon identified in step j, l) selecting those mapped non crust cutting strike slip faults which in plan view extend substantially perpendicularly to the adjacent crust cutting faults mapped in step l, wherein $S_H$ is substantially parallel with the opposing approaching sectors formed by the selected dextral and sinistral non crust cutting strike slip faults in that horizon.

66. A method according to claim 65 including:

m1) identifying at least one anticline within the horizon identified in step i, n1) mapping in plan the anticline at the horizon identified in step m1, o1) selecting at least one mapped anticline which in plan view extends substantially parallel to the adjacent crust cutting faults mapped in step i; wherein $S_H$ is substantially perpendicular to the selected anticlines in that horizon.

67. A method according to claim 65 including:

m2) identifying at least one syncline within the horizon identified in step i, n2) mapping in plan the syncline at the horizon identified in step m2, o2) selecting at least one mapped syncline which in plan view extends substantially parallel to the adjacent crust cutting faults mapped in step i; wherein $S_H$ is substantially perpendicular to the selected syncline in that horizon.

68. A method according to claim 65 including:

m3) identifying at least one reverse fault within the horizon identified in step l, n3) mapping in plan the reverse fault at the horizon identified in step m3, o3) selecting at least one mapped reverse fault which in plan view extends substantially parallel to the adjacent crust cutting faults mapped in step l;

wherein $S_H$ is substantially perpendicular to the selected reverse fault in that horizon.

69. A method according to claim 65 including:

m4) identifying at least one non crust cutting normal fault within the horizon identified in step i, n4) mapping in plan the non crust cutting normal fault at the horizon identified in step m4, o4) selecting at least one mapped non crust cutting normal fault which in plan view extends substantially perpendicular to the adjacent crust cutting faults mapped in step i;

wherein $S_H$ is substantially parallel to the selected non crust cutting normal faults in that horizon.

70. A method according to claim 65 including p1) repeating step g for at least one different compressional pulse period, q1) identifying at least one anticline within the horizon identified in step p1, r1) mapping in plan the anticline at the horizon identified in step q1, s1) superimposing the mapped plan from r1 over the mapped plan from i t1) selecting at least one mapped anticline from step r1 which in plan view extends substantially parallel to the adjacent crust cutting faults mapped in step i;

wherein $S_H$ is substantially perpendicular to the selected anticlines from step t1 in the horizon identified from step p1.

71. A method according to claim 65 including p2) repeating step g for at least one different compressional pulse period, q2) identifying at least one syncline within the horizon identified in step p2, r2) mapping in plan the syncline at the horizon identified in step q2, s2) superimposing the mapped plan from r2 over the mapped plan from i t2) selecting at least one mapped syncline from step r2 which in plan view extends substantially parallel to the adjacent crust cutting faults mapped in step i;

wherein $S_H$ is substantially perpendicular to the selected synclines from step t2 in the horizon identified from step p2.

72. A method according to claim 65 including p3) repeating step g for at least one different compressional pulse period, q3) identifying at least one reverse fault within the horizon identified in step p3, r3) mapping in plan the reverse fault at the horizon identified in step q3, s3) superimposing the mapped plan from r3 over the mapped plan from i t3) selecting at least one mapped reverse fault from step r3 which in plan view extends substantially parallel to the adjacent crust cutting faults mapped in step i;

wherein $S_H$ is substantially perpendicular to the selected reverse fault from step t3 in the horizon identified from step p3.

73. A method according to claim 65 including p4) repeating step g for at least one different compressional pulse period, q4) identifying at least one non crust cutting normal fault within the horizon identified in step p4, r4) mapping in plan the non crust cutting normal fault at the horizon identified in step q4, s4) superimposing the mapped plan from r4 over the mapped plan from i t4) selecting at least one mapped non crust cutting normal fault from step r4 which in plan view extends substantially perpendicular to the adjacent crust cutting faults mapped in step i;

wherein $S_H$ is substantially parallel to the selected non crust cutting normal faults from step t4 in the horizon identified from step p4.

74. A method according to claim 65 including p5) repeating step g for at least one different compressional pulse period, q5) identifying at least one non crust cutting strike slip fault with a right or dextral sense of offset and a second non crust cutting strike slip fault with a left or sinistral sense of offset within the horizon step identified in step p5, r5) mapping in plan the non crust cutting strike slip faults at the horizon identified in step q5, s5) superimposing the mapped plan from r5 over the mapped plan from i t5) selecting those mapped non crust cutting strike slip faults which in plan view extend substantially perpendicularly to the adjacent crust cutting faults mapped in step i, wherein $S_H$ is substantially parallel with the opposing approaching sectors formed by the selected dextral and sinistral strike slip faults from step t5 in the horizon identified from step p5.

75. A method according to claim 65 including obtaining more than three seismic reflection lines within the prospect so as to produce a more detailed map.

76. A method according to claim 75 including obtaining more than two seismic reflection lines which cross the prospect substantially in the direction of maximum dip, and obtaining more than one seismic reflection line which crosses the more than two lines and extends approximately long the longitudinal axis of the prospect so as to produce a more detailed map.

77. A method according to claim 65 wherein the determining and assigning step f includes obtaining survey wellbore data and conducting palaeontological analysis of that data to assign ages to the horizons.

78. A method according to claim 65 wherein the determining and assigning step f includes identifying on the selected seismic lines at least one globally distinctive horizon formed during a compressional pulse period and assigning ages to preceding and succeeding horizons formed during compressional pulse periods by reference to the chart of globally synchronous compressional pulses.

79. A method according to claim 65 wherein the step of identifying at least one substantially vertical crust cutting fault includes identifying on the selected seismic lines an upper crust and identifying the faults that cut the upper crust as crust cutting faults.

80. A method according to claim 65 wherein the step of identifying at least one substantially vertical crust cutting fault includes identifying at least one substantially vertical fault, obtaining earthquake data in the region of the fault that indicates $S_H$ is substantially in a horizontal plane and approximately perpendicular to one other parallel trending substantially vertical fault in the region of the earthquake data, identifying such a fault as the crust cutting fault.

81. A method of determining the magnitude of the maximum horizontal stress ($S_H$) relative to the maximum vertical stress ($S_V$) at a horizon within a prospect including the following steps: a) obtaining a plurality of seismic reflection lines within the prospect; b) selecting at least two seismic reflection lines which cross the prospect substantially in the direction of maximum dip; c) selecting at least one further seismic line which lies along a longitudinal axis of the prospect; d) identifying on the selected seismic lines at least one substantially vertical crust cutting fault; e) identifying on the selected seismic lines a plurality of horizons; f) determining and assigning the plurality of horizons with geological ages; g) identifying on the selected seismic lines at least one horizon produced during a compressional pulse period; h) selecting at least one horizon from step g which is cut by at least one of the identified crust cutting faults, i) mapping in plan the crust cutting fault at the horizon selected in step h, j) identifying on the seismic line at the selected horizon produced during a compressional pulse period anticlines and non crust cutting reverse faults being structures extending parallel with crust cutting faults in the horizon, k) mapping in plan the identified anticlines and non crust cutting reverse faults for the selected horizon, l) identifying areas in the selected horizon where the anticlines are traversed vertically by non crust cutting reverse faults, m) identifying areas in the selected horizon where the anticlines are not traversed by any faults, wherein the magnitude of $S_H$ relative to $S_V$ is greater within those areas traversed by reverse faults.

82. A method according to claim 81 including n) identifying areas on the seismic line in the selected horizon where the anticlines are not traversed by any faults, o) identifying areas on the seismic line in the selected horizon normal faults or strike slip faults and where the anticlines are traversed substantially longitudinally by the normal faults or strike slip faults, p) identifying areas on the seismic line in the selected horizon areas where there are no anticlines, wherein the magnitude of $S_H$ relative to $S_V$ decreases stepwise from the area identified in step m to the area identified in step p.

* * * * *